United States Patent
Sato

(10) Patent No.: US 6,508,169 B1
(45) Date of Patent: Jan. 21, 2003

(54) COMPOUND RECORDING APPARATUS AND COMPOUND RECORDING AND PROCESSING METHOD

(75) Inventor: Kazuo Sato, Hachioji (JP)

(73) Assignee: Konica Corporation, Tokyo (JP)

( * ) Notice: Subject to any disclaimer, the term of this patent is extended or adjusted under 35 U.S.C. 154(b) by 114 days.

(21) Appl. No.: 09/614,385

(22) Filed: Jul. 11, 2000

(30) Foreign Application Priority Data

Jul. 14, 1999 (JP) .......................................... 11-200817

(51) Int. Cl.[7] .............................................. B05C 17/06
(52) U.S. Cl. .................. 101/128.21; 101/484; 101/129; 400/582
(58) Field of Search ........................... 101/128.21, 129, 101/484, 485, 486; 400/582, 599, 599.1, 605, 610.1, 610.2; 347/101; 271/8.1, 9.05, 9.07

(56) References Cited

U.S. PATENT DOCUMENTS

| | | | | |
|---|---|---|---|---|
| 4,385,827 A | * | 5/1983 | Naramore | .................... 355/14 |
| 4,473,425 A | * | 9/1984 | Baughman et al. | ......... 156/356 |
| 5,296,908 A | * | 3/1994 | Hatano et al. | .............. 355/319 |
| 5,629,775 A | * | 5/1997 | Platteter et al. | ............. 358/296 |
| 6,256,463 B1 | * | 7/2001 | Manzer et al. | ................ 399/76 |

FOREIGN PATENT DOCUMENTS

JP          10-000814          1/1998

* cited by examiner

Primary Examiner—John S. Hilten
Assistant Examiner—Darius N. Cone
(74) Attorney, Agent, or Firm—Frishauf, Holtz, Goodman & Chick, P.C.

(57) ABSTRACT

A compound recording method and compound recording apparatus are provided for producing a printed product. The apparatus includes a plurality of image forming devices to form images on a plurality of recording sheets based on a plurality of image data arbitrarily obtained. Each of the image forming devices forms a separate image on a separate recording sheet in parallel with other image forming devices, and a sheet finisher is provided to accept the plurality of recording sheets ejected from the plurality of image forming devices and apply a designated finish-processing to the plurality of recording sheets on which the images are already formed by the plurality of image forming devices.

22 Claims, 21 Drawing Sheets

COMPOUND RECORDING APPARATUS AND COMPOUND RECORDING AND PROCESSING METHOD

BACKGROUND OF THE INVENTION

The present invention relates to a compound recording apparatus and a compound recording and processing method which are suitable to be applied to a compound machine equipped with a facsimile function, a copying function and a printer function.

With recent development of image processing technology, a recording apparatus of an electro-photographic system, which forms a monochrome image on a recording sheet, and a recording apparatus of an ink jet system, which forms a color image on a recording sheet are available on the market. Further, there is used an image forming apparatus equipped with finishing functions for attaching a front cover (hereinafter, referred to as a cover) and a backbone on recording sheets after image forming, or inserting a partition sheet in recording sheets.

Incidentally, based on a requirement for usage from users, there is a demand for making copies in a form of a booklet from a compound document containing a monochrome document and a color document. For the requirement of this kind, TOKKAIHEI No. 10-814 discloses a compound recording apparatus equipped with a recording apparatus of an electro-photographic system and a recording apparatus of an ink jet system.

In this compound recording apparatus, a recording sheet on which a monochrome image was formed by a recording apparatus of an electro-photographic system and a record on which a color image was formed by a recording apparatus of an ink jet system are ejected respectively on separate sheet ejection trays. Therefore, a user can make a booklet from a compound document containing a monochrome document and a color document mixedly, by rearranging the recording sheets for monochrome images and the recording sheets for color images both ejected to separate sheet ejection trays in a prescribed order, and by binding the recorded objects on one end of them, after attaching a cover and a backbone in case of need.

However, in a conventional compound recording apparatus., when making a booklet from a compound document containing a monochrome document and a color document mixedly, the timing for the monochrome image recording sheet to be ejected from the recording apparatus of an electro-photographic system to the sheet ejection tray and the timing for the color image recording sheet to be ejected from the recording apparatus of an ink jet system to the sheet ejection tray are not synchronized. It is therefore necessary for the user to rearrange the monochrome image recording sheets and the color image recording sheets both ejected to their respective sheet ejection trays, in the prescribed order.

For example, when using a recording apparatus of an ink jet system and a recording apparatus of an electro-photographic system equipped with a finishing function in combination, the timing to eject a monochrome image recording sheet and the timing to eject a color image recording sheet are not synchronized. It is therefore necessary for a user to rearrange the color image recording sheets and the monochrome recording sheets remaining unfinished both ejected respectively to their own sheet ejection trays, in accordance with prescribed order. After that, the user needs to set the recorded objects again on the finishing apparatus. Therefore, it is complicated for the user to rearrange the recording sheets and to set the recording sheets on the finishing apparatus, which is a problem.

SUMMARY OF THE INVENTION

An object of the invention, therefore, is to provide a compound recording apparatus and a compound processing method wherein images are formed on separate recording sheets by a plurality of different image forming apparatuses, and then, the recording sheets are finished collectively.

Accordingly, to overcome the cited shortcomings, the abovementioned object of the present invention can be attained by an apparatus and a method described as follow.

(1) An apparatus for producing a printed product, comprising: a plurality of image forming devices to form images on a plurality of recording sheets based on a plurality of image data arbitrarily obtained, each of said image forming devises forms a separate image on a separate recording sheet in parallel with other image forming devices; and a sheet finisher to accept said plurality of recording sheets ejected from said plurality of image forming devices and apply a designated finish-processing to said plurality of recording sheets on which said images are already formed by said plurality of image forming devices.

(2) A method for producing a printed product, comprising steps of: forming a separate image on each of a plurality of recording sheets in parallel, based on a plurality of image data arbitrarily obtained; collecting said plurality of recording sheets, on each of which said separate image is already formed, at one place; and applying a designated finish-processing to said plurality of recording sheets, which is collected at one place in said collecting step.

Further, to overcome the abovementioned problems, other embodiments of the compound recording apparatus and compound recording method of the present invention may include the following additional features.

A compound recording apparatus is equipped with two or more of image forming means, serving as image forming devices, each forming an image on each recording sheet in parallel based on given image information and with a finishing means, serving as a sheet finisher, which collects two or more recording sheets after image forming outputted from each image forming apparatus to one place and gives desired finish-processing to the recording sheets.

In the compound recording apparatus related to the invention, an image is formed on each recording sheet in parallel by each of two or more image forming means, based on given image information. In this case, two or more recording sheets after image forming processing are collected to one location by a finishing means, and for example, two or more recording sheets after image forming are collated at high speed in the order designated in advance, or, the recording sheets are bound on their one end after being collated, or, a cover and a back cover are attached on the collated recording sheets, or, two or more recording sheets after image forming are folded and collated into a folio form, or, a cover and a back cover are attached on the recording sheets in the folio form after one end thereof is bound.

Therefore, for example, when making a booklet from a compound document containing mixedly a monochrome document and a color document, it is possible to conduct bookbinding for recording sheets on which monochrome images are formed and recording sheets on which color images are formed, in the order prescribed in advance and at the high speed.

In the compound recording method related to the invention, an image is formed on each of recording sheets in parallel based on given image information, and then, two or more recording sheets on which images have been formed in parallel are collected to one location to be subjected to desired finish-processing.

In the compound recording method of the invention, a plurality of recording sheets on which images have been formed in parallel are collected to one location, and then, for example, plural sheets of recording sheets after image forming are collated at high speed in the order designated in advance, or, the recording sheets are bound after being collated, or, a cover and a back cover are attached on the collated recording sheets and are bound, or, plural recording sheets after image forming are fold and collated into a folio form, or, a cover and a back cover are attached on the collated recording sheets in the folio form and are bound. Therefore, for example, when making a booklet from a compound document containing mixedly a monochrome document and a color document, it is possible to conduct bookbinding for recording sheets on which monochrome images are formed and recording sheets on which color images are formed, in the order prescribed in advance and at the high speed.

DETAILED DESCRIPTION OF THE PREFERRED EMBODIMENT

Now, the compound recording apparatus and the compound record-processing method both related to the invention will be explained as follows, referring to drawings.

Figure 1:
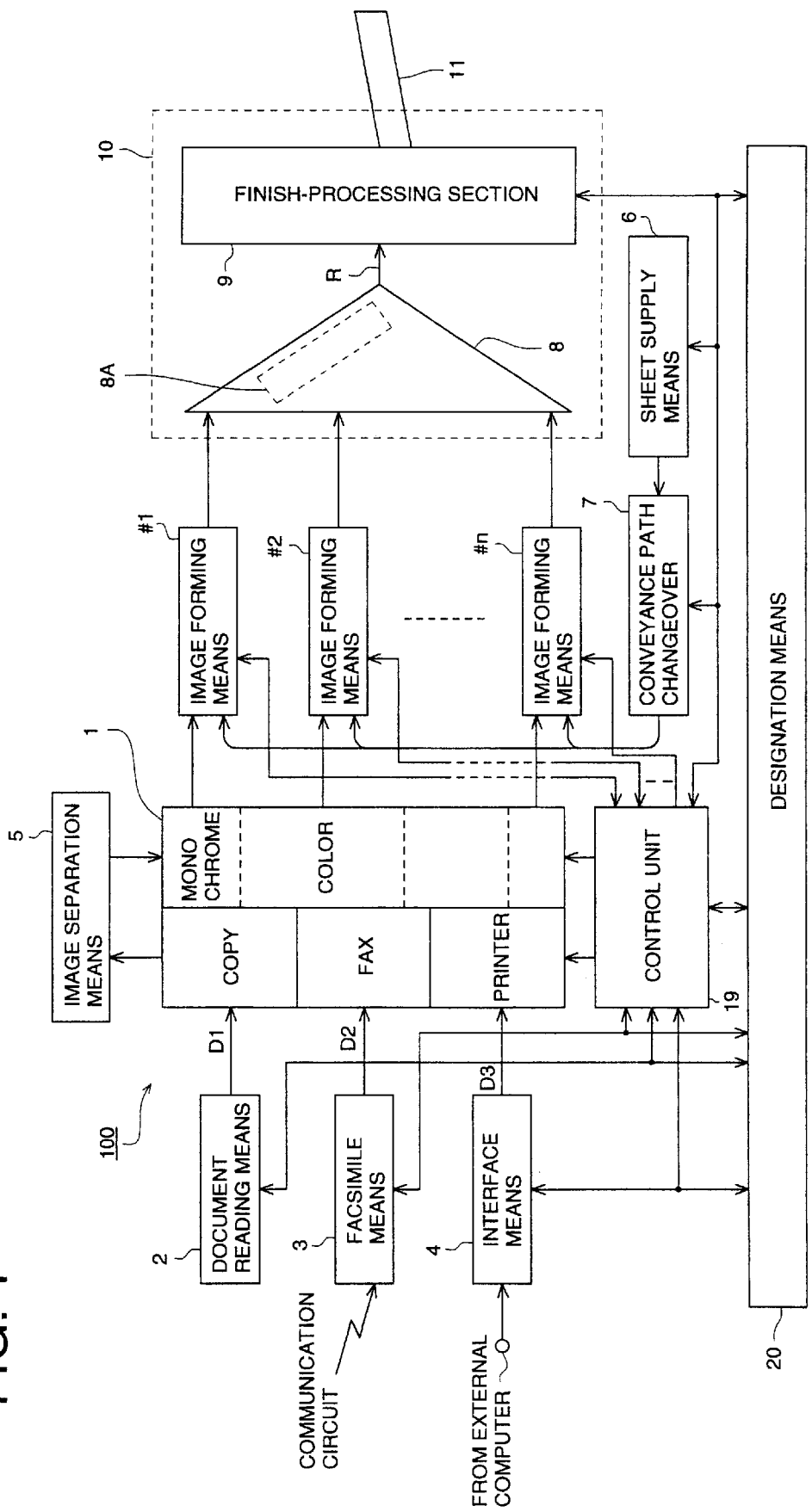
FIG. 1 is a block diagram showing an example of structure of compound recording apparatus 100 representing an embodiment of the invention.

(1) Compound Recording Apparatus and Compound Record-processing Method Representing an Embodiment FIG. 1 is a block diagram showing an example of structure of compound recording apparatus 100 representing an embodiment of the invention.

In the present embodiment, a finishing means is provided on the rear stage of plural image forming means to collect two or more recording sheets after image forming to one location to give them finish-processing, so that recording sheets on which monochrome images are formed and recording sheets on which color images are formed may be bound at high speed in accordance with sequence designated in advance, when making a booklet from a compound document containing mixedly a monochrome document and a color document.

In the compound recording apparatus 100 shown in FIG. 1, there is provided image memory 1 serving as a storage means, for making a booklet from a compound document containing mixedly a monochrome document and a color document. In this image memory 1, there is used DRAM (dynamic random access memory) whose memory area is divided into a copy area, a FAX area, a printer area, an editing area for monochrome images and an editing area for color images.

Document reading means 2 is connected with image memory 1, and monochrome or color document image data D1 obtained by reading given documents are stored temporarily in the copy area. On the other hand, facsimile means 3 is connected with image memory 1, and received image data D2 sent from a remote apparatus are temporarily stored in a FAX area. Further, interface means 4 is connected with image memory 1, and monochrome or color processed image data D3 processed by an external computer are recorded temporarily in a printer area (image information source).

Image separation means (separation means) 5 is connected with image memory 1, and when image information source equivalent to plural pages is given, image information pages for monochrome use and image information pages for color use are separated from the image information source. As a separation method, in the case of compressed image information such as, for example, JPEG system or MPEG system, separation is conducted by identifying an identification graph showing monochrome images written as header information of data sequence for each page and by identifying an identification graph showing color images written as header information of data sequence for each page. The reason for this is to group pages of monochrome images with image data only of monochrome images and to group pages of color images with only color image data.

On the output stage of the image memory 1, there are provided image forming means #i (i=1–n) in quantity of n, and each recording sheet R is subjected to image forming processing in parallel based on given image information from the aforesaid image information source. On each image forming means #I, monochrome images or color images caused by the aforesaid document reading means 2, received images caused by facsimile means 3, or monochrome or color processing images caused by interface means 4 are formed on recording sheet R. In this example, at least, color images are formed by image forming means #1 on another recording sheet R based on image information for color, and monochrome images are formed by image forming means #2 on recording sheet R based on image information for monochrome. In the present example, a recording apparatus of an ink jet system is used for the image forming means #1, while, a recording apparatus of an electro-photographic system is used for the image forming means #2.

Further. Sheet supply means 6 of a common type is provided on each image forming means #I, and recording sheets are allocated and supplied to each image forming means #i. Plain paper is used as a recording sheet. In the present example, there is provided conveyance path changeover means 7 on the downstream side of sheet supply means 6 of a common type, and thereby, conveyance paths for recording sheets to be supplied to each image forming means #i from sheet supply means 6 are switched.

In the conveyance path changeover means 7, a conveyance path is connected between image forming means #1 and sheet supply means 6 when supplying recording sheets to the image forming means #1, while, a conveyance path is connected between image forming means #2 and sheet supply means 6 when supplying recording sheets to the image forming means #2.

It is naturally possible to provide sheet supply means 6' of an individual type on each image forming means #i and thereby to supply recording sheets independently and individually. For example, it is also possible to supply from sheet supply means to image forming means #1 (recording apparatus of an ink jet system) transfer sheets used exclusively for ink jet in place of a plain paper.

On the downstream side of these image forming means #i, there is provided finishing means 10, and two or more recording sheets R outputted from each image forming means #i are collected to one location to be subjected to desired finish-processing. The finishing means 10 has therein conveyance means 8 and finish-processing section 9. On the conveyance means 8, recording sheets R after image forming ejected respectively from image forming means #i are guided so that they are collected to the finish-processing section 9.

In the present example, standby section 8A is provided on conveyance means 8 so that recording sheet R on which a monochrome image has been formed may stand by temporarily. The reason for this is to synchronize the progress of the recording sheet R on which a monochrome image has been formed with the progress of the recording sheet R on which a color image has been formed, because the time required for processing to form monochrome images is less than that required for processing to form color images. On the standby section 8A, there is provided an unillustrated position sensor which detects whether all recording sheets R are complete or not, and position detection signals showing the detection results are outputted to the control means.

On the finish-processing section 9 provided on the downstream side of conveyance means 8, two or more recording sheets R after image forming are collated and then are bound on their one end, or the recording sheets R are collated and then, a cover is attached thereon, or the recording sheets R are collated, and then, a cover and a back cover are attached thereon.

Further, in the present example, the finish-processing section 9 folds two or more recording sheets R into a folio form and collates them, or it attaches a cover on the recording sheets R in a folio form, or it attaches a cover and a back cover on the recording sheets R in a folio form. On the downstream side of the finish-processing section 9, there is provided sheet ejection tray 11 so that processed records may be ejected.

In the present example, the aforesaid document reading means 2, facsimile means 3, interface means 4, and finishing means 10 are connected to designating means 20 and thereby, a user designates so that two or more recording sheets R after image forming may be collated in the desired order. For example, with regard to two or more recording sheets R after image forming, the designating means 20 is used to set the contents of finish-processing such as binding one end of recording sheets R, attaching a cover on the recording sheets R and attaching a cover and a back cover on the recording sheets R. Folding recording sheets R into a folio form is naturally designated.

Control unit (control means) 13 is connected between the designating means 20 and image memory 1, and each image forming means #i is controlled so that processing to form monochrome images and processing to form color images may be coordinated, based on contents designated by the designating means 20. Contents of the coordination are as follows. First, control unit 19 controls image memory 1 to edit image information for monochrome images and image information for color images, based on the desired order designated in advance. For example, in the case where monochrome image pages and color image pages are mixed in image information equivalent to plural pages, when the position to file the color image pages in the monochrome image pages is recognized, the time to start image forming for color image pages in that for monochrome image pages is operated. This operation is to synchronize the reading time for image information for monochrome images edited by image memory 1 with the reading time for image information for color images.

In accordance with the time to start image forming for color image pages for the time to start image forming for monochrome image pages, control unit 19 reads image memory 1 to control, so that image information for monochrome images and image information for color images both edited by image memory 1 may be transmitted to each image forming means #i at the prescribed timing. Due to this, when making a booklet from a compound document wherein a monochrome document and a color document are mixed, it is possible to control so that monochrome images are formed on recording sheet R and color images are formed on another recording sheet T in parallel, in accordance with the order designated in advance.

Figure 2:
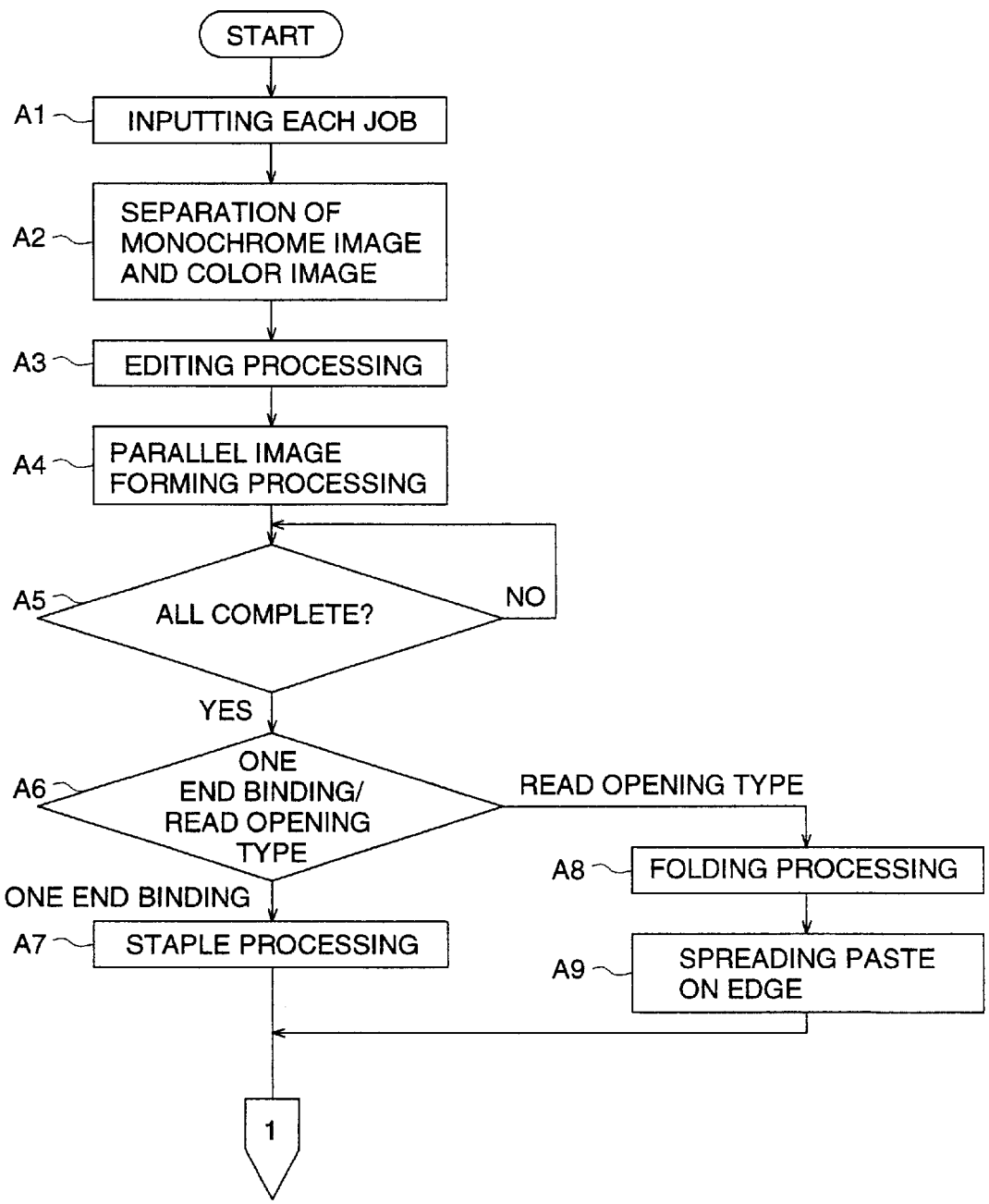
FIG. 2 is a flow chart showing an example of recording processing (part-1) in compound recording apparatus 100.
Figure 3:
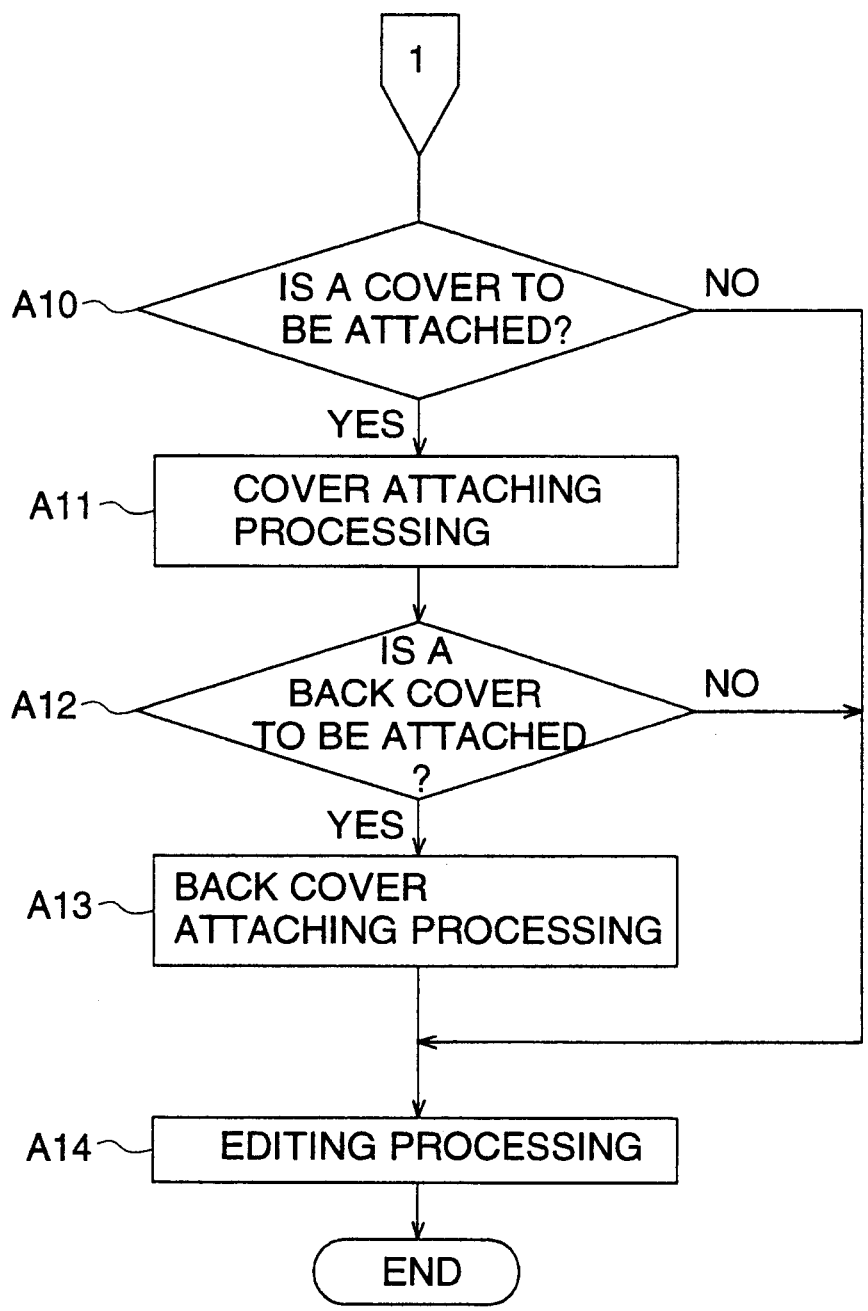
FIG. 3 is a flow chart showing an example of recording processing (part-2) in compound recording apparatus 100.

Next, an example of processing in compound recording apparatus 100 will be explained, concerning the compound recording-processing method related to the present embodiment. FIGS. 2 and 3 are flow charts showing examples of recording-processing (part 1 and part 2) in compound recording apparatus 100.

In this example, there is assumed an occasion wherein an image is formed on each recording sheet R in parallel based on given image information of an image information source, then, two or more recording sheets R on which images have been formed in parallel are collected to one location to be subjected to desired finish-processing, and then bookbinding is conducted in the order designated in advance. The assumption also includes that there are designated the contents of finish-processing to use designating means 20 in advance for binding one end of recording sheets R, attaching a cover on the recording sheets R, and attaching a cover or a back cover of the recording sheets R.

Under the assumptions stated above, various jobs are inputted in control unit 19 from designating means 20 in step Al of the flow chart shown in FIG. 2. Contents of the jobs in this case are directions to the effect of "making a booklet" by using a monochrome image or a color image obtained by document reading means 2, an image received by facsimile means 3, or a monochrome or color processed image obtained by interface means 4. In the case wherein monochrome image pages and color image pages are mixed in image information equivalent to plural pages, a position for the color image to be inserted in monochrome images, a position for a white sheet to be inserted, or whether a cover and a back cover are attached or not are naturally directed. In accordance with this direction, document image data D1, received image data D2 or processed image data D3 are recorded temporarily on image memory 1.

After that, a monochrome image page and a color image page are separated from image information source by image separation means 5 in step A2. Then, in step A3, there is conducted an editing processing wherein monochrome image pages are grouped by image information of the monochrome image page, while, color image pages are grouped by image information of the color image page.

After that, for conducting image forming processing in parallel in step A4, image data for color are outputted to image forming means #1 of an ink jet system, and image data for monochrome are outputted to image forming means #2 of, for example, an electro-photographic system. In each image forming means #i, a color image is formed on recording sheet R through ink jet system based on image data for color, and a monochrome image is formed on recording sheet R through an electro-photographic system based on image data for monochrome.

In this case, the recording sheet R on which a monochrome image has been formed is made to stand by temporarily by standby section 8A, because monochrome image forming processing is faster than color image forming processing. The reason for this is to synchronize the recording sheet R on which a monochrome image has been formed with the recording sheet R on which a color image has been formed in terms of the state of progress. After that, in step A5, it is judged whether recording sheets R each having thereon a formed monochrome image and recording sheets R each having thereon a formed color image are complete or not. Regarding the judgment in this case, an unillustrated position sensor detects whether the recording sheets R are complete or not, and then, position detection signals showing the results of the detection are outputted to control unit 19 for recognition.

Accordingly, when the recording sheets R relating to monochrome images and the recording sheets R relating to color images are not complete, they stand by until all of recording sheets R become complete. Then, after both of recording sheets R become complete, judgment is made in step A6 whether binding of one end of recording sheets R is designated or a folio form is designated. When it is judged that binding of one end of recording sheets R is designated, a sequence advances to step A7 where stapling processing is conducted. In this stapling processing, one end is bound by a stapler after two or more recording sheets R after image forming are collated.

Further, when the folio form is designated in step A6, the sequence advances to step A8 where recording sheets R after image forming are subjected to twofold processing. After that, the sequence advances to step A9 where paste is applied on edges of the recorded object. Due to this processing, it is possible to fold two or more recording sheets R after image forming into a folio form to collate them.

After the staple processing is finished, the sequence advances to step A10 where it is judged whether a cover is attached or not. When a cover is attached, the sequence advances to step A11 where the cover is attached on the surface of the first page of the recording sheets R. In this processing, a cover is attached on the surface side of the recorded object representing the collated two or more recording sheets R after image forming. When folding in a folio form is designated in step A6, a cover is attached on the recorded object folded in a folio form and collated in step A11.

The reason why the step of attaching a cover is conducted after the processing of binding one end is because it is sometimes better to form the cover independently of recording sheets R when the cover is thick compared with the recording sheets R. When the cover is thin, it is naturally possible to conduct the judgment step for a cover immediately after the step to designate whether binding one end of recording sheets R or a folio form in step A6, and thereby to conduct staple processing for recording sheets R and a cover simultaneously.

After that, the sequence advances to step A12 where it is judged whether a back cover is attached or not. When the back cover is to be attached, the sequence advances to step A13 where the back cover is attached on the reverse side of the last page of recording sheets R. In this processing, the back cover is attached on the reverse side of the last page of the collated two or more recording sheets R after image forming. It is therefore possible to attach a cover and a back cover on the recorded object after image forming.

When folding in a folio form is designated in step A6, a back cover is attached, in step A13, on the reverse side of the last page of recording sheets R folded in a folio form and collated. It is therefore possible to attach a cover and a back cover on the recorded object in the folio form. When a cover is not attached in the step A10 and when attaching of a back cover in step A13 is completed, the sequence advances to step A14 wherein recorded object is ejected out of sheet ejection tray 11.

As stated above, in the compound recording apparatus 100 related to the present embodiment, monochrome images and color images are formed on each recording sheet R in parallel in step A4 by image forming apparatuses #i in quantity n, based on given image information of an image information source. Now, two or more recording sheets R after image forming processing are collected to one location by conveyance means 8 in finishing means 10, and then, two or more recording sheets R after image forming are collated at high speed in the order designated in advance in step A5, or, one end of the recording sheets R is bound after they are collated in step A&, or a cover and a back cover are attached on the bound recording sheets R in step A11, or two or more recording sheets R after image forming are folded in the folio form and collated in step A8, or a cover and a back cover are attached in step A13 after one end of the recording sheets R in the folio form is bound in step A9.

Therefore, in the case to make a booklet from a compound document wherein a monochrome document and a color document are mixed, recording sheets R on which monochrome images have been formed and recording sheets R on which color images have been formed can be bound at high speed in the order designated in advance.

(2) First Example

Figure 4:
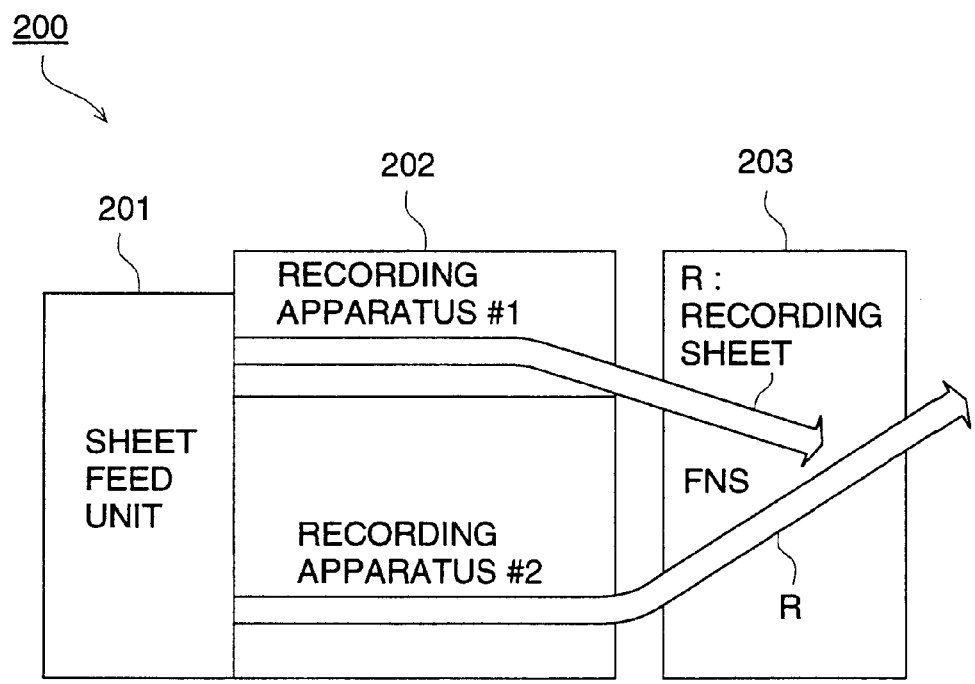
FIG. 4 is a conceptual diagram showing an example of structure of compound apparatus 200 representing the first example.
Figure 5:
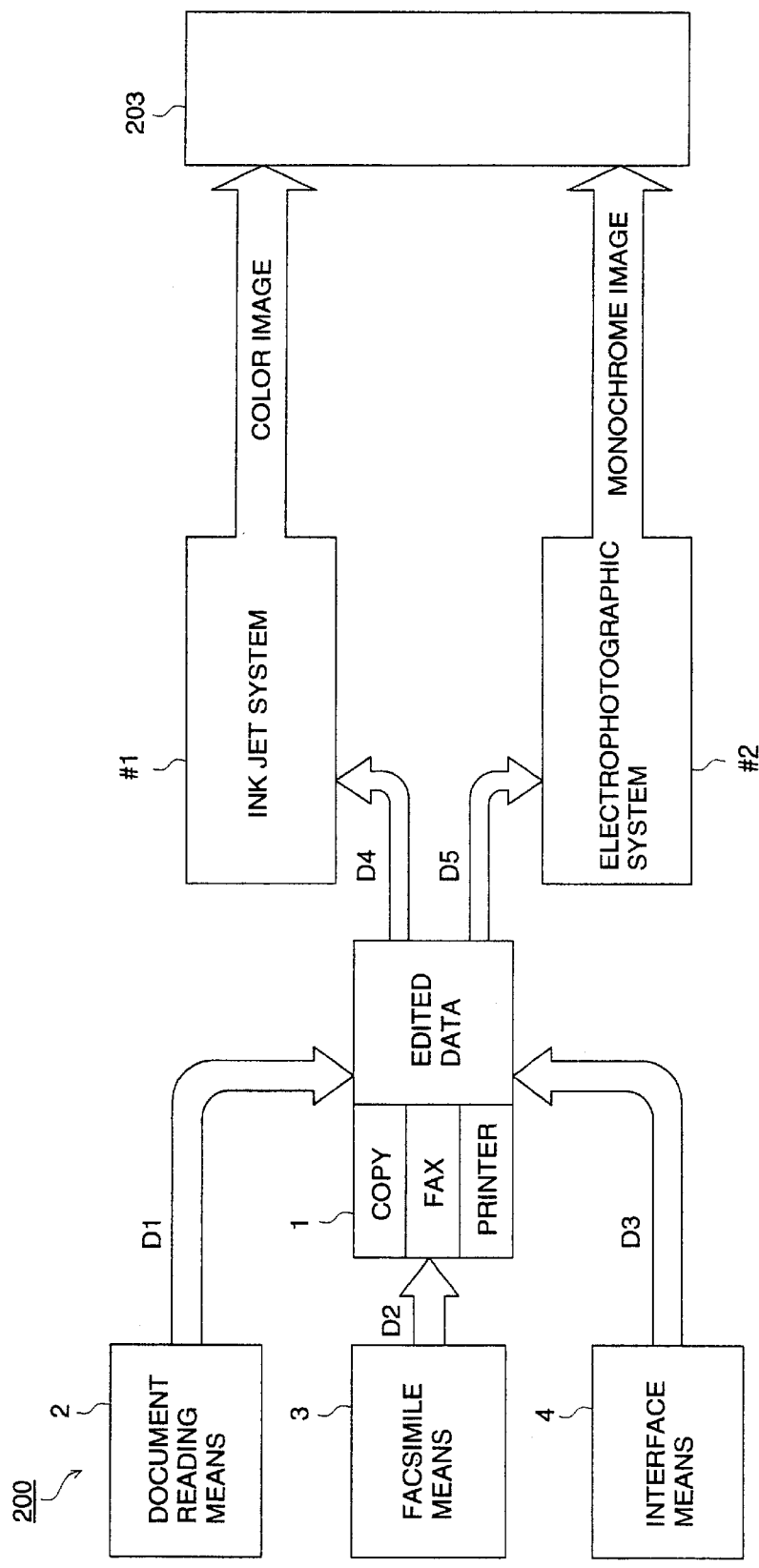
FIG. 5 is a conceptual diagram showing an example of flows of image information, a monochrome image recording sheet and a color image recording sheet in compound apparatus 200.

FIG. 4 is a conceptual diagram showing an example of structure of compound apparatus 200 representing the first example. FIG. 5 is a conceptual diagram showing an example of flow of image information, a monochrome image recording sheet and a color image recording sheet in the compound apparatus 200.

The compound apparatus 200 shown in FIG. 4 is composed of sheet feed unit 201 having the sheet supply means 6 of a common use type, image forming apparatus 202 having therein color image recording apparatus #1 of an ink jet system and monochrome image recording apparatus #2 of an electro-photographic system, and of finisher (FNS) 203 having finishing means 10.

In this example, recording sheets are supplied from sheet feed unit 201 respectively to recording apparatus #1 and recording apparatus #2, then, color images are formed on recording sheets by recording apparatus #1 and monochrome images are formed on recording sheets by recording apparatus #2, and then, color image recording sheets R by recording apparatus #1 and monochrome image recording sheets R by recording apparatus #2 are bound to be a booklet.

An image information source in this example includes document image data D1 from the aforesaid document reading means 2, received image data D2 by facsimile means 3 and processed image data D3 by interface means 4. These image data D1–D3 are edited by image memory 1. Image data for color after editing are supplied to recording apparatus #1 of an ink jet system, and in the same way, image data for monochrome after editing are supplied to recording apparatus #2 of an electro-photographic system. Processed image recording sheets R of external computer which are color-image-formed by recording apparatus #1, document recording sheets R on which monochrome images are formed by recording apparatus #2 and FAX document recording sheets R are collated collectively by finisher 203 to be bound into a booklet.

Figure 6:
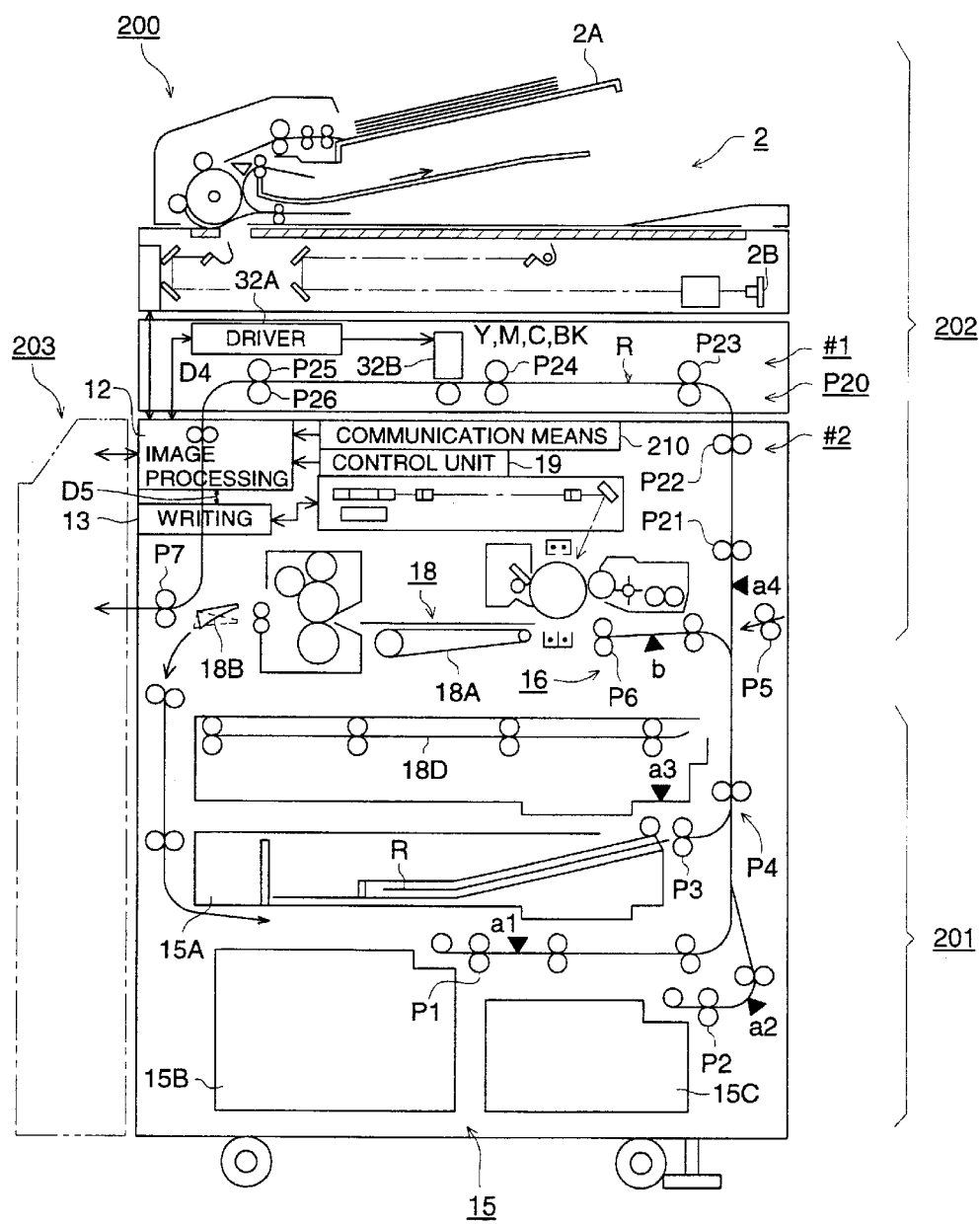
FIG. 6 is a conceptual diagram showing an example of internal structure of compound apparatus 200 representing the first example.

FIG. 6 is a conceptual diagram showing an example of internal structure of compound apparatus 200 representing the first example. The compound apparatus 200 shown in FIG. 6 is composed of sheet feed unit 201, image forming apparatus 202 and finisher 203. The image forming apparatus 202 is provided with image reading means 2, image processing means 12, image writing means 13, recording apparatus #1 of an ink jet system, recording apparatus #2 of an electro-photographic system, first sheet feed means 15, second sheet feed means 16, fixing means 17, conveyance means 18, control means 19 and with communication means 210:

The first sheet feed means 15 is composed of cassette sheet feed section 15A and large capacity sheet feed sections (LCT) 15B and 15C or of an unillustrated manual sheet feed section. The second sheet feed means 16 has registration roller P6. The conveyance means 18 is provided with conveyance belt 18A, conveyance path changeover plate 18B, sheet ejection roller P7 and automatic two-sided image forming conveyance section (ADU) 18D.

There is provided automatic document feed unit (ADF) 2A constituting image reading means 2 over the recording apparatus #1. To the left side of the image forming apparatus 202 on the part of the sheet ejection roller P7, there is connected finisher 203. A document placed on a document stand of the automatic document feed unit 2A is conveyed in the direction of an arrow mark, and thereby, images on a single side or on both sides of the document are read by an optical system of the image reading means 2 and then are read into CCD image sensor 2B. Analog signals obtained through photoelectric conversion by the CCD image sensor 2B are subjected to analog processing, A/D conversion, shading correction and image compression processing, in image processing means 12. After that, image data D4 for color are supplied to recording apparatus #1 of an ink jet system, while, image data D5 for monochrome are sent to image writing means 13.

Further, the recording apparatus #1 has therein driver 32A and ink jet section 32B for yellow Y, magenta M, cyan C. and black BK. On the recording apparatus #1, ink for Y, M, C and BK are jetted to recording sheet R based on image data D4 for color, and color images are formed accordingly. For example, when recording sheet R fed out of the first sheet feed means 15 is conveyed to be under the ink jet section 32B for Y, M, C and BK through conveyance roller group P20 on the upstream side, color images are formed at the prescribed timing and at the prescribed jetting position (image forming position) by driver 32A based on image data D4 for color.

The recording sheet R on which the color images have been formed is conveyed by conveyance roller group P20 on the downstream side to be fed into finisher 203 through sheet ejection roller P7. The conveyance roller group P20 on the upstream side is composed of conveyance rollers P21–P24, while, the conveyance roller group P20 on the downstream side is composed of conveyance rollers P25–P27.

In the image writing means 13, light outputted from a semiconductor laser is irradiated on a photoreceptor drum of recording apparatus #2, and a latent image is formed. In the recording apparatus #2, treatments such as charging, exposure, developing, transfer, separation and cleaning are conducted. For example, recording sheet R fed out of first sheet feed means 15 passes through registration roller P6, and then, is subjected to image forming processing at a transfer position (image forming position) where a transfer electrode faces the photoreceptor drum. The recording sheet R on which an image has been formed through the aforesaid transfer is conveyed by conveyance belt 18A, then, is subjected to fixing processing by fixing means 17, and is fed into finisher 203. In the case of two-sided image forming, recording sheet R having on its one side a processed image fed into conveyance section 18D for two-sided image forming by conveyance path changeover plate 18B is conveyed again to the recording apparatus #2 wherein an image is formed on the reverse side of the recording sheet at the transfer position, and is fed into finisher 203.

Figure 7:
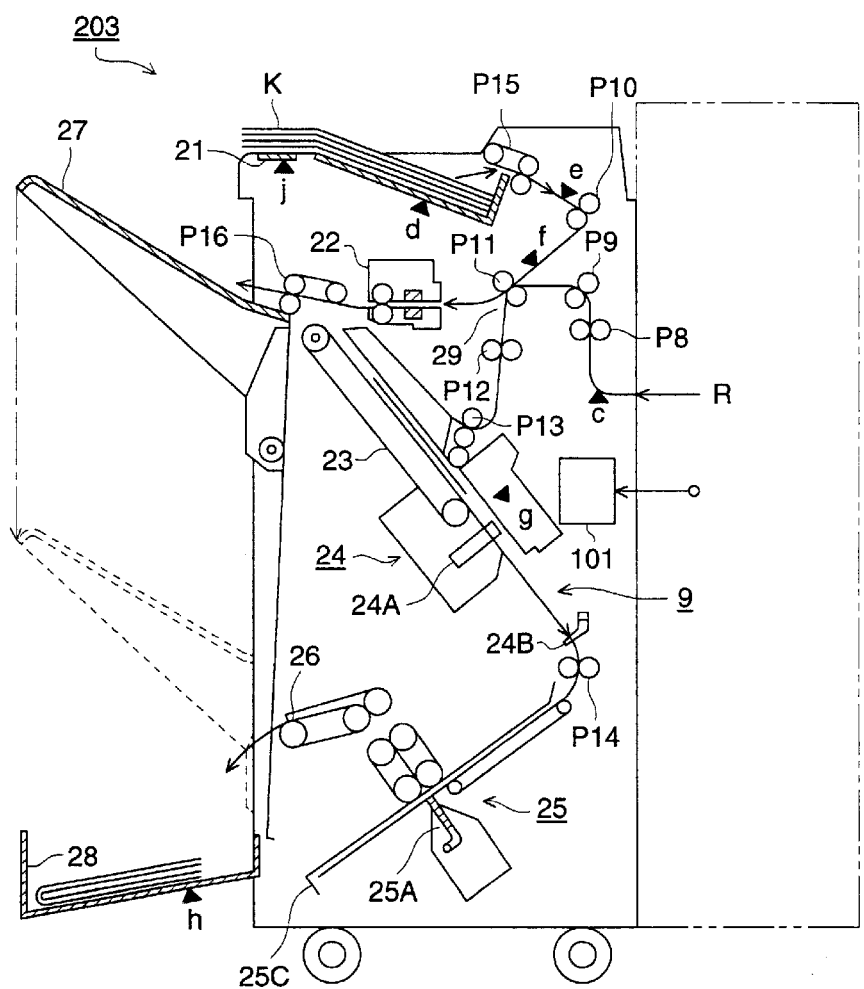
FIG. 7 is a conceptual diagram showing an example of internal structure of finisher 203.

FIG. 7 is a conceptual diagram showing an example of internal structure of finisher 203. In the finisher 203 shown in FIG. 7, there are arranged sheet loading means 21, shift processing section 22, first loading section 23, stapling means 24 representing finish-processing section 9 and folding means 25 in this order from the top almost in the longitudinal direction. on the illustrated left side of the finisher 203, there are arranged elevator type sheet ejection tray 27 on which end-bound and shift-processed recording sheets R are stacked and fixed sheet ejection tray 28 on which center-bound and folded recording sheets R are stacked. These elevator type sheet ejection tray 27 and fixed sheet ejection tray 28 constitute sheet ejection tray 11.

Conveyance paths for recording sheet R and sheet K which is used as a cover, a partition sheet or a back cover in the compound apparatus 200 are as follows. In the case of image forming for monochrome or for color, when either of cassette sheet feed section 15A, large capacity sheet feed sections 15B and 15C and an unillustrated manual sheet feed section is selected in image forming apparatus 202, recording sheet R is fed from either one of conveyance (sheet feed) rollers P1, P2, P3 and P5 to recording apparatus #1 or to recording apparatus #2.

When processing color images and monochrome images in parallel, recording sheet K is naturally fed to each of both recording apparatus #1 and recording apparatus #2. The conveyance rollers P1, P2, P3 and P5 constitute first sheet feed means 15, and sheet feeding is started by sheet feed signals. The first sheet feed means 15 is constituted by a belt trained about rollers, and one recording sheet R is separated from either one of cassette sheet feed section 15A, large capacity sheet feed sections 15B and 15C and a manual sheet feed section to be conveyed to recording apparatus #1 or to recording apparatus #2.

Conveyance roller group P4 is driven to convey the recording sheet R conveyed from sheet feed rollers P1, P2 and, P3 to recording apparatus #1 or to recording apparatus #2. Incidentally, conveyance rollers P1, P2, P3 and P5 can also be arranged so that recording sheet R is stopped temporarily when its leading edge arrives at a roller which is in the forefront of the conveyance roller group P4 after being fed out by the conveyance rollers, and then is conveyed by the conveyance roller group 4 again. The recording sheet R stops temporarily at a position immediately before registration roller P6, and then, is fed again by the registration roller P6 which rotates in synchronization with image forming in recording apparatus #2. The recording sheet R ejected out of emage forming apparatus 202 through conveyance belt 18A, fixing means 17 and sheet ejection roller P7 is led to finisher 203.

In the finisher 203, the recording sheet R is conveyed to first loading section 23 through conveyance rollers P8 and P9, junction roller P11 and conveyance rollers P12 and P13. At the first loading section 23, the recording sheet R falls because of gravity, and its lower edge is aligned by stopper 24A. Sheet K used as a cover, a partition sheet and a back cover is stacked on sheet loading means 21 structured with a tray on which sheets are stacked, and is conveyed by sheet feed roller P15 and conveyance roller P10 which constitute the sheet loading means 21.

The recording sheet is made by the junction roller P11 to join conveyance means 8, and then is conveyed to the first loading section 23, thus, its lower edge is aligned by stopper 24A. Sheet feed roller P15 is conveyance means 18 which separates and conveys one sheet loaded in the sheet loading means 21, and it is composed of a belt trained about a fanning roller and a pair of rollers.

Recorded objects which are superposed in the order of a cover, recording sheets R, partition sheet K, recording sheets R and a back cover and are stacked on the first loading section 23 are bound by stapling means 24, and then, are ejected on elevator type sheet ejection tray 27 through sheet ejection roller P16 pushed up by stopper 24A. In the aforesaid conveyance path, conveyance rollers P8 and P9, junction roller P11, conveyance roller P12, sheet feed roller P15 and conveyance roller P10 constitute conveyance means 8, stapling means 24 constitutes finish-processing section 9, elevator type sheet ejection tray 27 or fixed sheet ejection tray 28 constitutes sheet ejection tray 11, and sheet feed roller P15 constitutes sheet feed means 21.

Eight sensors Sj (j=1–8) are attached on compound apparatus 200 shown in FIGS. 6 and 7. In FIG. 6 and FIG. 7, a1–a4, b–h, and j show positions for attaching sensors S11–S14 and S2–S8.

On first sheet feed means starting point al representing the starting position for each recording sheet R, there is attached unillustrated recording sheet detection sensor S11 which detects the start of feeding recording sheet R fed out of cassette sheet feed section 15A. In the same way, sensor S12 is attached on first sheet feed means starting point a2, and the start of feeding recording sheet R fed out of large capacity sheet feed section 15B is detected, and sensor S13 is attached on first sheet feed means starting point a3, and the start of feeding recording sheet R fed out of large capacity sheet feed section 15C is detected. Sensor S14 is attached on first sheet feed means starting point a4, and the start of feeding recording sheet R inserted through an unillustrated manual sheet feed section is detected. Further, unillustrated recording sheet sensor S2 is attached at second sheet feed means starting point b, and a starting point for the sheet feeding by second sheet feeding means 16 (conveyance roller P6) is detected.

Further, on first conveyance means starting point c in the vicinity of an inlet for a recording sheet on finisher 203, there is attached unillustrated recording sensor S3, and when a leading edge of recording sheet R arrives at conveyance means 8, the leading edge is detected and conveyance of the recording sheet R by the conveyance means 8 is started.

On sheet presence deciding point d in the vicinity of the front end portion of sheet loading section 21, there is attached unillustrated sensor S4, and thereby, a sheet fed out by sheet feed roller 15 is detected, and when the trailing edge of the sheet passes through that point (sheet presence deciding point), the presence of sheet on sheet loading means 21 is detected. On second conveyance means starting point e in the vicinity of the immediate upstream side of conveyance roller P10 of conveyance means 8, there is attached sheet sensor S5, and thereby, the start of conveyance of a sheet by conveyance roller P10 is detected, and in detail, the start of conveyance of the sheet by sheet refeeding is detected.

Further, on junction point f in the vicinity of the immediate upstream side of conveyance roller P11, there is attached unillustrated recording sheet sensor S6, and passage of a sheet through the junction point f is detected. On finish-processing section position g in stapling means 24, there is attached unillustrated recording sheet sensor S7, and arrival of recording sheet R at stapling means 24 and that of a sheet at stapling means 24 are detected.

Incidentally, recording sensor S8 is attached on fixed sheet ejection tray position (sheet ejection tray) h, and unillustrated sensor S9 is attached on sheet presence deciding point j in the vicinity of the rear end portion of sheet loading means 21, thereby, when sheet feed roller P15 starts feeding a sheet, presence of the following sheet in the sheet loading means 21 is detected.

In the present embodiment, there is provided a finishing mode which will be explained next. In this example, it is possible to select the finishing mode by setting on an operation section of image forming apparatus 202 constituting designating means 20, or by setting on an operation section of finisher 203.

(1) Non-staple, Non-sort Mode, Shift Processing Mode

Recording sheet R after image forming ejected from image forming apparatus 202 is conveyed by conveyance rollers P8 and P9 and by junction roller P11, and is guided by changeover guiding means 29 to be ejected to elevator type sheet ejection tray 27 through a shift processing means. When the shift processing is set, a shift processing means operates to shift and eject recording sheet R for each job.

(2) Staple Mode

Recording sheet R after image forming ejected from image forming apparatus 202 is conveyed by conveyance rollers P8 and P9 and by junction roller P11, and is guided by changeover guiding means 29 to conveyance roller P13 and is conveyed by conveyance rollers P12 and P13 to first loading section 23. The recording sheet is bound by stapling means 24 on the first loading section 23. The recording sheet R which has been bound is pushed up by stopper 24A and is ejected to elevator type sheet ejection tray 27 through sheet ejection roller P16. It is also possible to select a mode to conduct finishing of attaching a cover, a back cover and partition sheet K and to conduct binding processing, through operation on an operation section of image forming apparatus 202 or of finisher 203.

In this staple mode, sheets conveyed from sheet loading means 21 are added as a cover, a partition sheet and a back cover to a bundle of recording sheets R which are fed from image forming apparatus 202 and are stacked on first loading section 23. Further, sheet K conveyed by sheet feed roller P15 and conveyance roller P10 is made by junction roller P11 to join conveyance means 8, and is conveyed to first loading section 23.

(3) Folding, Center-binding Mode

Recording sheet R conveyed to first loading section 23 falls down to the position of stopper 24B, and its leading edge is aligned by stopper 24B. A plurality of recording sheets R are stacked on first loading section 23, and are subjected to staple processing by stapling means 24. After this processing, the stopper 24B is opened and the recording sheet R is conveyed to second placing section 23. Recording sheets R held at the proscribed position by stopper 25C on second placing section 25 are subjected to folding processing conducted by folding means 25B composed of protruding means 25A and a pair of belts/rollers. The recording sheets R after folding processing are ejected to fixed sheet ejection tray 28. Even in the case of the folding mode, it is possible to conduct processing to add a cover, a back cover and partition sheet K to the recording sheets R, which is the same as in the staple mode mentioned above.

Figure 8:
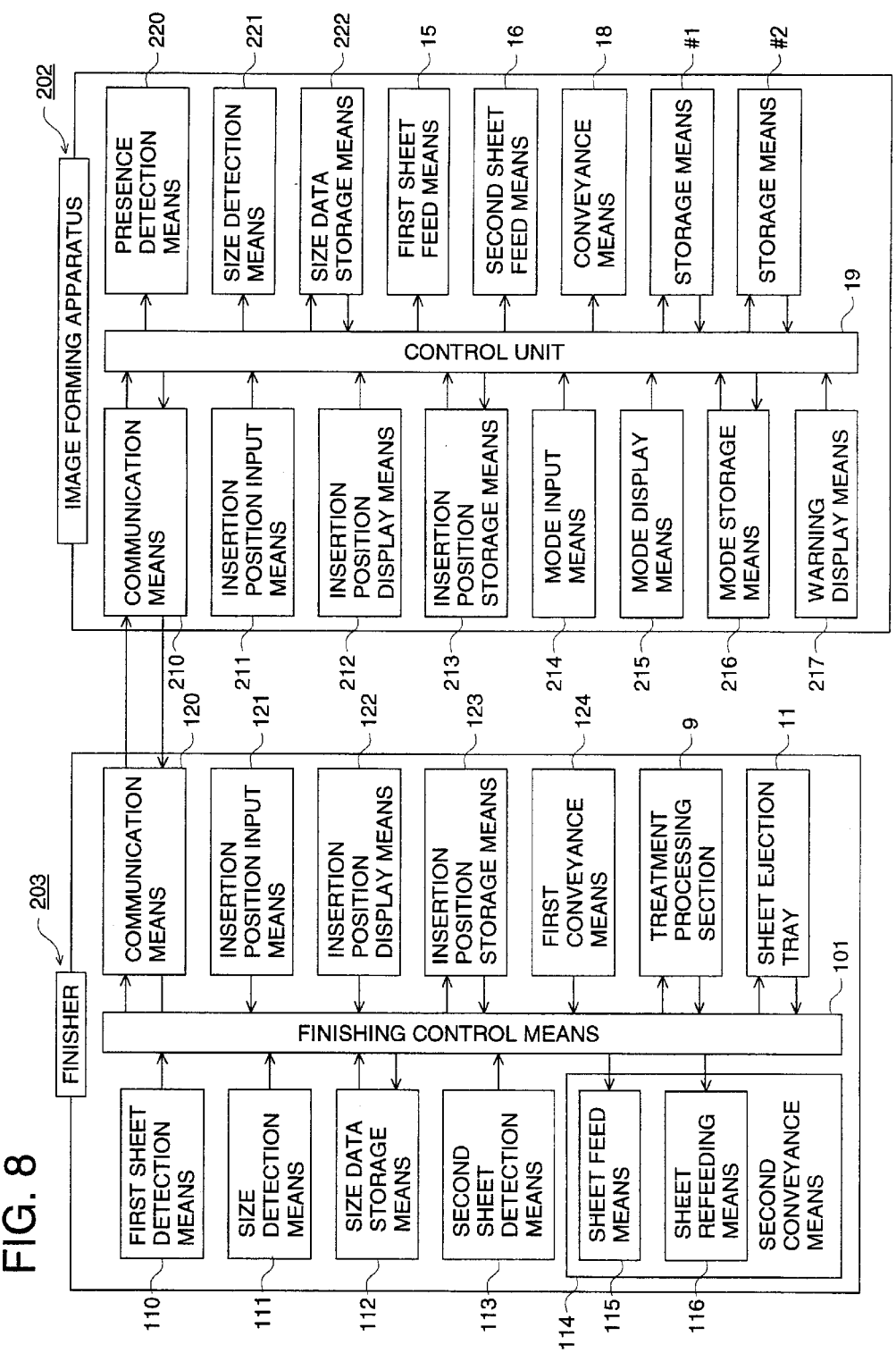
FIG. 8 is a block diagram showing an example of structure of a system control system of the compound apparatus 200 shown in FIGS. 6 and 7.

FIG. 8 is a block diagram showing an example of structure of system control system for compound apparatus 200 shown in FIGS. 6 and 7. Finisher 203 shown in FIG. 8 has therein finishing control means 101. First sheet detection means 110 having the sensor S4 stated above is connected to the finishing control means 101, and thereby, presence of a sheet on sheet loading means 21 is detected. In the same way, sheet size detection means 111, size data storage means 112, second sheet detection means 113, second conveyance means 114, communication means 120, insertion position inputting means 121, display means 122, insertion position storage means 123, first conveyance means 124, finish-processing section 9 and sheet ejection tray 9 are connected to the finishing control means 101.

In a word, the sheet size detection means 111 is a sensor which detects a size of a sheet on sheet loading means 21, and second sheet detection means which will be explained later is used also as this sensor. In the size data storage means 112, there are stored sizes of sheets detected by the sheet size detection means 111.

The second sheet detection means 113 has sensor S9 which is provided on the rear end portion of the sheet loading means 21. With regard to the sensor S9, when the leading edge of sheet K on the sheet loading means 21 arrives at conveyance roller P10 at the moment when the leading edge of recording sheet R arrives at conveyance roller P10, the trailing edge of sheet K fed out is not detected. Therefore, recording sheet R to be detected by the sensor S9 follows sheet K which is fed out of the sheet loading means 21 and precedes.

The second conveyance means 114 is one constituting a part of conveyance means 8, and it has sheet feed means 115 which separates one sheet from sheets on sheet loading means 21 to feed it out and reconveyance means 116. The communication means 120 is connected with communication means 210 of image forming apparatus 202 to communicate between image forming apparatus 202 and finisher 203. On the insertion position inputting means 121, the position for inserting a partition sheet in recording sheets R is established through external operations. On the display means 122, there is displayed an insertion position established by the insertion position inputting means 121. In the insertion position storage means 123, there is stored the established insertion position.

The first conveyance means 124 is one to constitute another part of conveyance means 8, and it conveys recording sheet R conveyed from image forming apparatus 202 to finish-processing section 9. In the present example, the first conveyance means 124 is composed of conveyance rollers P8, P9 and P12 shown in FIG. 7 and of junction roller P13.

The finish-processing section 9 is composed of stapling means 24 shown in FIG. 7. In addition to the stapling means shown in FIG. 7, there are provided a puncher, a folding means and a center-binding means in the finish-processing section 9. In the finishing control means 101, delivery and receipt of signals are conducted with each function section of the finisher 203 as shown in an arrow so that these sections are controlled, and thus, communication employing communication means 210 and communication means 120 is conducted with image forming apparatus 202.

The communication means 210 of image forming apparatus 202. is connected to control unit 19. To the control unit 19, there are connected insertion position inputting means 211, insertion position display means 212, insertion position storage means 213, mode inputting means 214, mode display means 215, mode storage means 215, warning display means 217, existence detection means 220, size detection means 221, size data storage means 222, first sheet feed means 15, second sheet feed means 16, conveyance means 18 and recording apparatuses #1 and #2.

In a word, the position for inserting partition sheet K in recording sheets R is set on insertion position inputting means 211 through external operations. On the display means 212, there is displayed the insertion position set by insertion position inputting means 211, and in storage means 213, the insertion position is stored. In this example, insertion of partition sheet K can be set from both of the finisher 203 and image forming apparatus 202. A setting section not only for insertion of partition sheet K but also for setting of a mode to attach a cover and a back cover, a folding mode and a center-binding mode can be provided also in image forming apparatus 202.

Further, in the mode inputting means 214, establishment of various modes such as the shift mode stated above, a staple mode, a folding mode, a center-binding mode and a mode to add a cover, partition sheet K and a back cover to recording sheets R, designation of sheet size for a cover, partition sheet K and a back cover which will be explained later, and designation of a sheet type, are accepted. The mode inputting means 214 further accepts even various settings mentioned above through a network. On the mode display means 215, there is displayed contents established by the mode inputting means 214. Contents of the establishment in this case are displayed either on an operation panel or on an equipment. In mode storage means 216, there is stored information inputted with the mode inputting means 214.

Various types of mode information stated above and information of position for inserting partition sheet K both established and stored in image forming apparatus 202 as stated above are transmitted to finisher 203 through communication means 210 and 120 in the course of image forming, and are used for control of finishing control means 101.

Existence detection means 220 for recording sheet R has therein cassette sheet feed section 15A, large capacity sheet feed sections 15B and 15C and recording sheet sensors S11–S14 provided on a manual sheet feed section. On each of these recording sheet sensors S11–S14, there is detected existence of recording sheet R in each sheet feed section. On the size detection means 221, a size of either one of recording sheets R loaded on each sheet feed section mentioned above is detected. In the size data storage means 222, there is stored the recording sheet size detected by the size detection means 221. A sheet feed means which supplies recording sheets R to recording apparatus #1 or #2 has therein first sheet feed means 15 and second sheet feed means 16. The irst sheet feed means 15 is provided on each of cassette sheet feed section 15A, large capacity sheet feed sections 15B and 15C and a manual sheet feed section, and recording sheets R are fed out of these sheet feed sections to be supplied to recording apparatus #1 or #2.

The second sheet feed means 16 is composed of registration roller P6 shown in FIG. 6, and it supplies recording sheet R to recording apparatus #1 or recording apparatus #2 in synchronization with image forming in recording apparatus #1 or recording apparatus #2.

Recording sheet R passing through transfer positions such as conveyance belt 18A, fixing means 17 and sheet ejection roller 18C is conveyed by conveyance means 18. In recording apparatus #1, a color image is formed on recording sheet R by ink jet of Y, M, C and BK. In recording apparatus #2, an image is formed on recording sheet R through charging, exposure, developing and transfer. On warning display means 217, warning is displayed when recording sheets are used up, sheets are not present, or when the designated sheet does not agree with the detected sheet. Incidentally, this warning display means 217 can be provided also on finisher 203. In control unit 19, delivery and receipt of signals shown in diagram are conducted with the aforesaid function sections, and thereby, these function sections are controlled.

In the present example, it is possible to establish a mode to add a cover and a back cover to a recorded object from an operation section of finisher 203, and a mode to insert partition sheet K in recording sheets R, and it is further possible to establish the position to insert partition sheet K in the partition sheet insertion mode.

Figure 9:
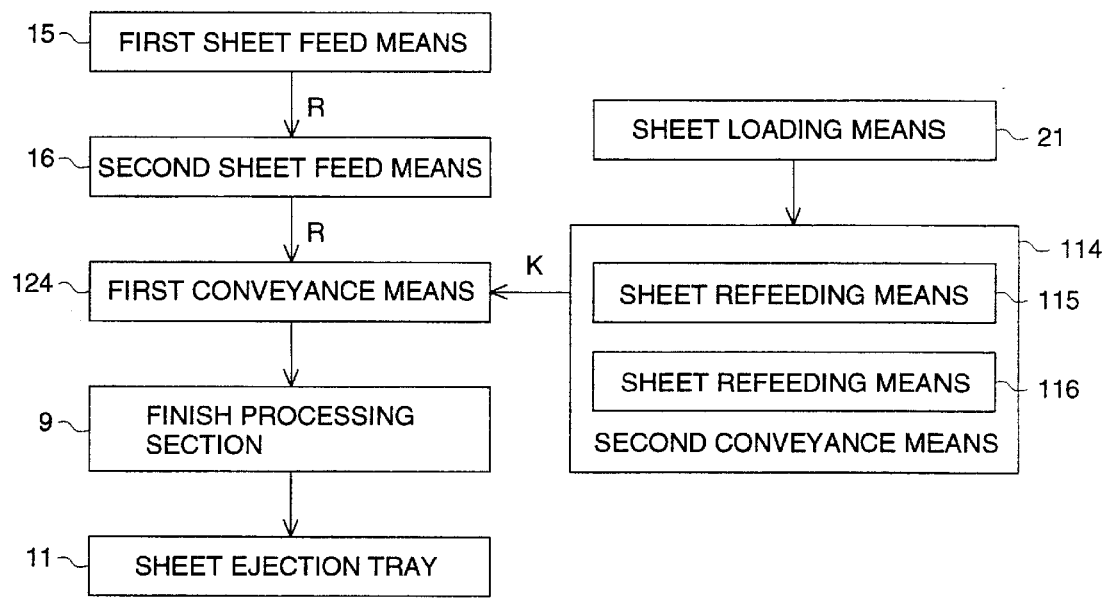
FIG. 9 is a block diagram showing an example of flows of recording sheet R and sheet K in compound apparatus 200.

Next, a conveyance path for recording sheets R and that for sheets K will be explained. FIG. 9 is a block diagram showing an example of a flow for each of recording sheet R and sheet K in compound apparatus 200. In this example, recording sheet R and sheet K are conveyed through conveyance paths shown in FIG. 9.

(1) Conveyance by the First Sheet Feed Means 15

When either one of sheet feed rollers P1, P2, P3 and P5 is selected and driven, recording sheet R is conveyed to conveyance means 18 from either one of cassette sheet feed section 15A, large capacity sheet feed sections 15B and 15C and a manual sheet feed section. First sheet feed means starting point a representing a standard point for conveyance control of recording sheet R represents the time when a signal for starting sheet feeding is outputted for sheet fed roller P1, P2, P3 or P5.

(2) Conveyance by the Second Sheet Feed Means 16

The recording sheet R conveyed by the first sheet feed means 15 stops temporarily on this side of registration roller P6, and when the registration roller P6 starts operating in synchronization with image forming in recording apparatus #2, for example, the recording sheet R is conveyed to the recording apparatus #2. Second sheet feed means starting point b representing a standard point for conveyance control of recording sheet R represents the time when the registration roller P6 starts operating.

The recording sheet R which has been subjected to fixing processing in recording apparatus #2 is conveyed to either one of straight sheet ejection path, reversing sheet ejection path, and conveyance path for automatic two-sided image forming 18D by conveyance path changeover plate 18B. The straight sheet ejection path is a conveyance path for feeding recording sheet R in finisher 203, and recording sheet R is guided by conveyance path changeover plate 18B located at the position shown with solid lines. The reversing sheet ejection path is a conveyance path which reverses recording sheet R to feed it in finisher 203. For example, the recording sheet R conveyed from a fixing unit is conveyed downward by conveyance path changeover plate 18B rotated to the position shown with dotted lines, and then, the recording sheet R is caused to switchback to be guided to sheet ejection roller P7 by conveyance path changeover plate 18B.

In this example, in a single-sided mode wherein an image is formed on one side of recording sheet R, the recording sheet R on which an image has been formed is fed into finisher 203 through the aforesaid reversing sheet ejection path. In two-sided image forming, the recording sheet R having on its one side a formed image is conveyed to conveyance section 18D by conveyance path changeover plate 18B located at the position shown with dotted lines, and is fed again to recording apparatus #2. After images are formed on both sides of recording sheet R, the recording sheet R is guided by conveyance path changeover plate 18 located at the position of solid lines to be fed in finisher 203 through the straight conveyance path.

(3) Conveyance by the First Conveyance Means 124

It is a process for recording sheet R to be conveyed to first loading section 23 by conveyance rollers P8–P13 after the recording sheet R on which images have been formed is ejected out of image forming apparatus 202. First conveyance means starting point c representing the standard point on conveyance control for recording sheet R and sheet K is the time when the leading edge of the recording sheet R arrives at recording sheet sensor S3 provided at an inlet for recording sheet on finisher 203.

(4) Conveyance by the Second Conveyance Means 114

In this example, a cover, a back cover or sheet K used as a partition is fed from sheet loading means 21 by sheet feed roller P15, and is conveyed by conveyance roller P10 to junction roller P11.

(5) Finishing

On recording sheet R and sheet K conveyed by first loading section 23, one end binding processing for binding an end position or center-binding processing for binding a center portion is performed by stapling means 24. For example, when recording sheet R and sheet K arrive at the first loading section 23, regulating plates 31 provided on both sides of the first loading section 23 reciprocate to adjust the recording sheet R and sheet K. In the first loading section 23, when a set of recorded object composed of recording sheets R, a cover and partition sheets K becomes complete, stapling means 24 operates and binding processing is conducted.

The recorded object which has been subjected to binding processing is ejected to elevator type sheet ejection tray 27 constituting sheet ejection tray 11 or to fixed sheet ejection tray 28. Arrival of recording sheet R and sheet K at finishing apparatus 24 is detected by unillustrated sheet sensor S7 provided at position g near stopper 24A.

Figure 10:
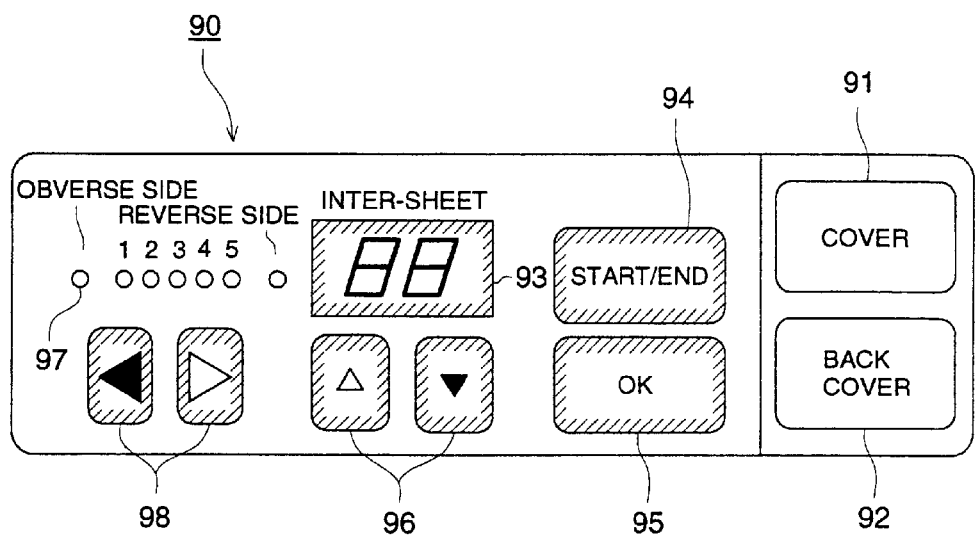
FIG. 10 is a conceptual diagram showing an example of structure of operation panel 90 in compound apparatus 200.

Next, there will be explained an example of structure of operation panel 90 in compound apparatus 200. FIG. 10 is a conceptual diagram showing operation panel 90 in compound apparatus 200. This operation panel 90 represents an example of designating means 12. The operation panel shown in FIG. 10 is provided with cover setting button 91, back cover setting button 92, inter-sheet display section 93, start/end button 94, OK button 95, numerical value inputting buttons 96 and 98 and display section 97.

The cover setting button 91 is operated when setting a mode to attach a cover, while the back cover setting button 92 is operated when setting a mode to attach a back cover. On the inter-sheet display section 93, there is displayed an inter-sheet mode when inserting partition sheet K. The start/end button 94 is operated when setting of an inter-sheet mode is started, or when the setting is finished. The OK button 95 is operated when deciding the setting of an inter-sheet mode. The numerical value inputting buttons 96 is operated in a way to input, in numerals, "the number of sheets" showing the number of recording sheets R after which the partition sheet K is to be inserted. The numerical value inputting buttons 98 is operated when designating the number of partition sheets K. This is used also when deciding which of the left end position and the right end position of recording sheets R to be bound.

Figure 11:
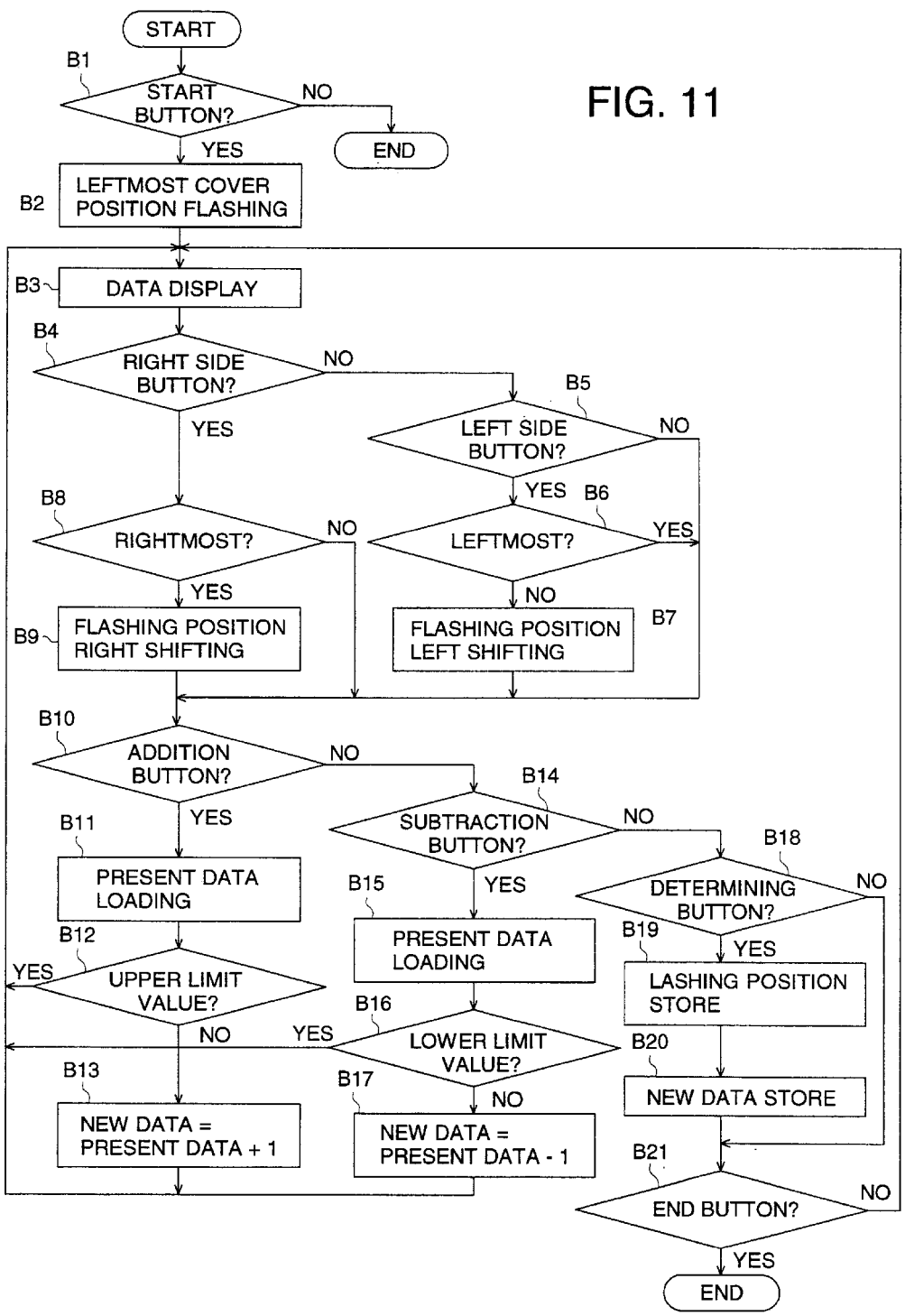
FIG. 11 is a flow chart showing an example of designation of insertion position for a cover and a back cover and partition sheet in compound apparatus 200.

Next, setting control in finisher 203 in the course of inserting partition sheet K will be explained. FIG. 11 is a flow chart showing an example of designation of positions to insert a cover, a back cover and partition sheet K in finisher 203.

In this example, it is an assumption to establish a position to insert partition sheet K in advance, when attaching a cover, a back cover or partition sheet K on a recorded object. It is assumed, in the case of recording sheet R, that a user selects in advance the occasion that recording sheet R is bound on its left end position or the occasion that recording sheet R is bound on its right end position. In the present example, it is assumed that initial setting is made so that "left side end cover position" may flicker on display section 97.

Under this assumption, it is judged first whether start button 94 or end button 95 was pressed or not in step B1 of the flow chart shown in FIG. 11. When the start button 94 is pressed in this case, the sequence advances to step B2 and display of "left end cover position" flickers on display section 97. In this case, the number of partition sheets is displayed in succession from the surface side on display section 97. As an initial value, a display corresponding to "1" flickers. After that, the sequence advances to step B3, responding to operations of numerical value inputting buttons 96 and 98, and the number of partition sheets is displayed on display section 93 as data. The partition sheet K is inserted after the number of recording sheets R displayed on the display section 93.

After that, in step B4, it is judged whether a right side button of numerical value inputting button 98 showing the right side end cover position was pressed or not. When the right side button is not pressed even after waiting for prescribed time, the sequence advances to step B5, and it is judged whether a left side button of numerical value inputting button 98 showing the left side end cover position was pressed or not. When the left side button is pressed, the sequence advances to step B6 where it is confirmed whether recording sheets R are bound on their left end portion or not. When the recording sheets R are bound on their left end portion, the sequence advances to step B7 where a flickering position is shifted to the left side to advance to step B10.

Incidentally, when the right side button is pressed, the sequence advances to step B8 where it is confirmed whether recording sheets R are bound on their right end portion or not. When the recording sheets R are bound on their right end portion, the sequence advances to step B9 where a flickering position is shifted to the right side, and then the sequence advances to step B10.

Therefore, when recording sheets R are bound neither on their right end portion nor on their right end portion, and after the prescribed position is shifted in step B7 and step B9, the numerical value inputting buttons 98 is operated to select desired partition sheet K. In the case of an addition operation, for example, the sequence advances to step B10 where addition processing is conducted, and then, in step B11, existing data are loaded. Then, it is judged whether the numerical value inputted by the numerical value inputting buttons 98 is an upper limit value or not. When it is an upper limit value, the sequence goes back to step B3. When it is not an upper limit value, the sequence advances to step B13 where existing data are subjected to incremental operation and new data are maintained. After that, the sequence goes back to step B3.

In the case of a subtraction operation, subtraction processing is conducted in step B14. After that, existing data are loaded in step B15. Then, it is judged whether the numerical value inputted by the numerical value inputting buttons 98 is a lower limit value or not in step B16. When it is a lower limit value, the sequence goes back to step B3. When it is not a lower limit value, the sequence advances to. step B17 where existing data are subjected to incremental operation and new data are maintained. After that, the sequence goes back to step B3.

Then, when OK button 95 is pressed in step B20 for decision (settlement), display of insertion position in display section 97 is held in insertion position storage means 123 (insertion position storage means 213 when established on image forming apparatus 202), so that the flickering position may be stored in step B19.

In step B20, insertion data for partition sheet K for recording sheets R are stored. It is possible to repeat the aforesaid registration of insertion position for partition sheet K, and it is possible to set insertion of partition sheets K up to six sheets as shown in display section 97 in this example. It is also possible to use insertion position inputting means 211 and insertion position display means 212 both on image forming apparatus 202 as sated above, for selection of a mode to attach a cover, a partition sheet and a back cover on recording sheets R and for designation of insertion position for partition sheet K.

Figure 12:
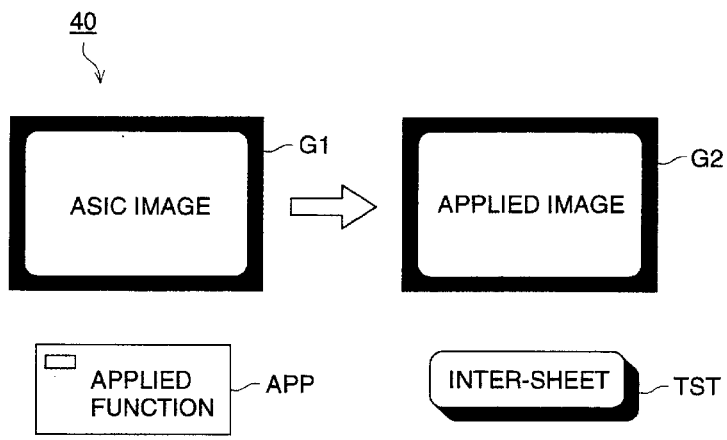
FIG. 12 is a state transition diagram showing an example of mode display of inter-sheet in image forming apparatus 202.

Next, there will be explained an example of setting for insertion of partition sheet K on image forming apparatus 202. FIG. 12 is a diagram of a state transition showing an example of mode display for inter-sheet in image forming apparatus 202. Even in this example, an insertion position for partition sheet K is set in advance when attaching a cover, a back cover or partition sheet K on a recorded object.

Display setting section 40 shown in FIG. 12 is one constituting a part of mode display means 215 shown in FIG. 8, and it is provided in image forming apparatus 202 and is composed of a touch panel having functions of insertion position inputting means 211 and insertion position display means 212.

On the touch panel, for example, tag APP for selection of applied equipment is displayed together with basic image plane G1. When this tag APP is selected and touched, the display is changed from basic image plane in FIG. 12 to applied image plane G2. Together with this, tag TST for setting inter-sheet is displayed on the lower portion of the applied image plane G2. In this example, when inserting partition sheet K in recording sheets K, tag TST for setting inter-sheet is selected. Incidentally, with regard to designation of insertion position in the case of a mode to insert a partition sheet, inputting is carried out through an unillustrated ten-key.

Figure 13:
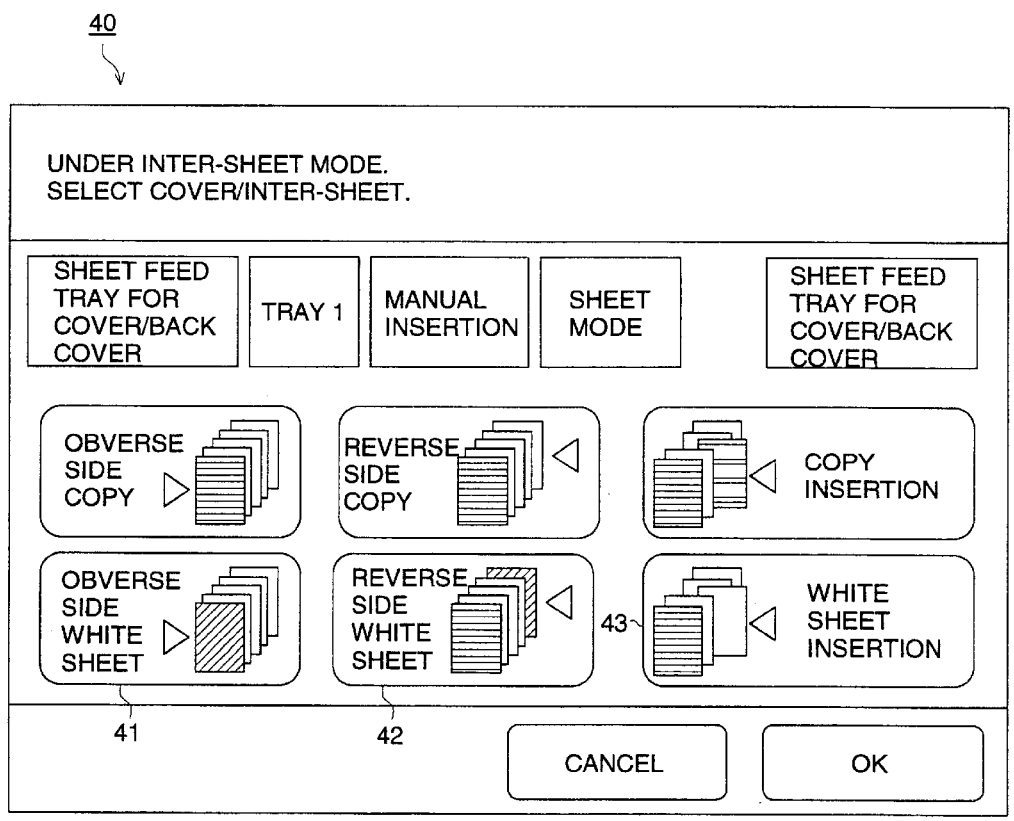
FIG. 13 is an image diagram showing an example of mode display for inter-sheet in display establishment section 40.

FIG. 13 is an image diagram showing an example of display of an inter-sheet mode on display setting section 40. Even in this example, display setting section 40 is provided with cover mode setting button 41, back cover mode setting button 42 and partition insertion mode setting button 43. These buttons 41–43 are operated to select a mode to attach a cover, a mode to attach a back cover or a mode to insert partition sheet K.

Figure 14:
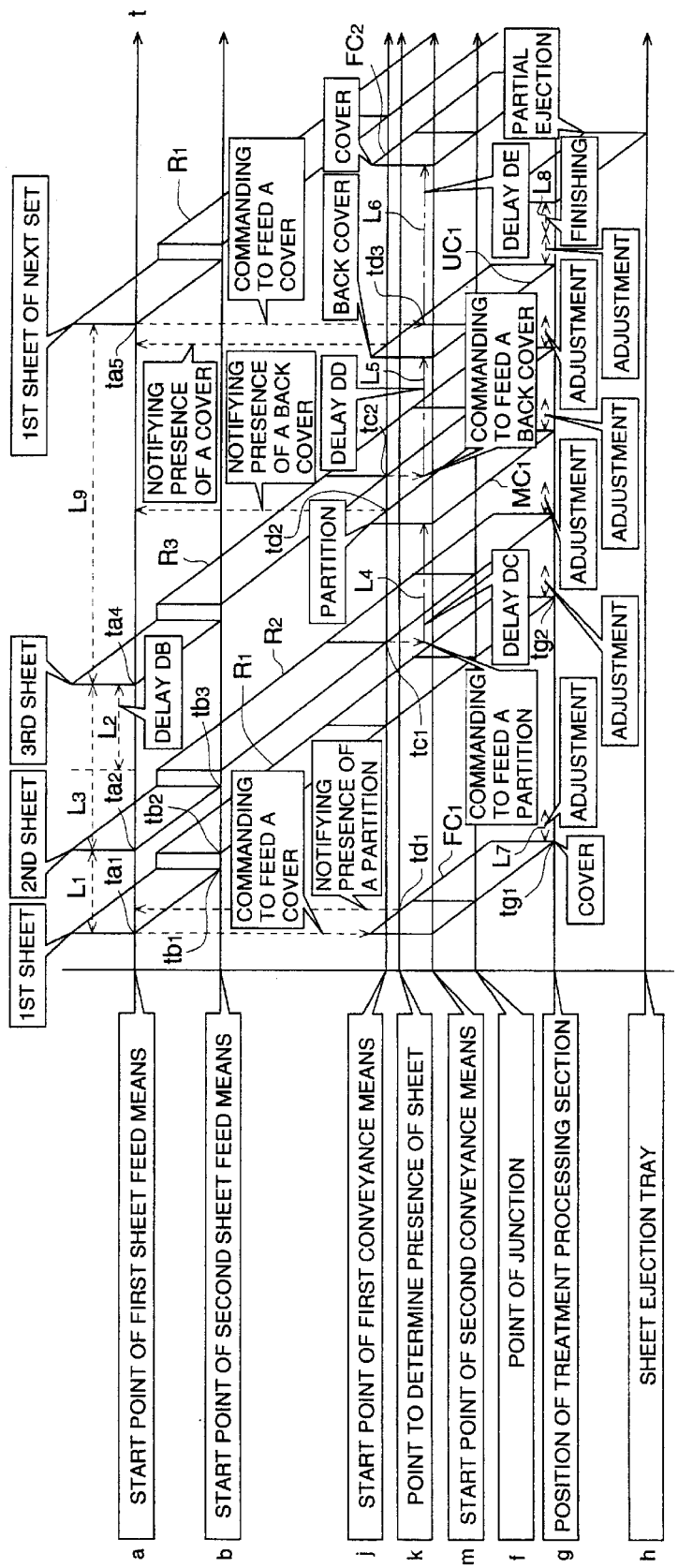
FIG. 14 is an action time chart for each structure section in the compound apparatus 200 shown in FIGS. 6–8.

Next, an example of operations of compound apparatus 100 will be explained. FIG. 14 is a time chart for operations of each structure section in compound apparatus 20 shown in FIG. 6–FIG. 8. In this example, there is given an example wherein recording sheets R for only monochrome images are bound to be a booklet. For example, let it be assumed that there are prepared two sets of recorded objects, in each of them, partition sheet C1 is inserted between the second recording sheet R2 and the third recording sheet R3, and a recorded object is covered by cover FC1 and back cover UC1. Incidentally, when making a booklet wherein recording sheets R for monochrome images and recording sheets R for color images are mixed, it is possible to calculate the time to start color images and the time to insert and thereby to insert recording sheet R of color images into the desired insertion position, as stated in the embodiment.

The axis of abscissas in FIG. 14 represents time, and the axis of ordinates represents positions of recording sheet R and sheets (partition sheet and a back cover) on the conveyance paths, or stages on the conveyance progress, and an upper portion represents upstream side and a lower portion represents downstream side. R1–R3 show recording sheet R conveyed, and FC1, FC2, MC1 and UC1 respectively represent a cover, partition sheet K and a back cover.

An arrow in a solid line in the direction of the axis of ordinates shows transmission of signals, and an arrow in dotted line in the direction of the axis of abscissas shows a time interval. The first recording sheet R1 starts at the first sheet feed means starting point a at the time of ta1, and arrives at the second sheet feed means at the time of tb1. Then, it stays at the second sheet feed means starting point b for a certain period of time so that the leading edge of the recording sheet R is adjusted in terms of timing. Then, in synchronization with image forming, the recording sheet R1 starts at the second sheet feed starting point b, then, is subjected to image recording processing by recording apparatus #2 in image forming apparatus 202, then is ejected out of the recording apparatus #2, and arrives at finish-processing position g through the first conveyance means starting point c in finisher 203 and junction point f.

While the recording sheet R is at the finish-processing position g, adjustment processing by reciprocation of side edge regulating plate 31 (see FIG. 7) in the lateral direction of recording sheet R1 is performed for the time interval L7 from time tg1, and thereby, the recording sheet R is positioned at prescribed location. The recording sheet R stays at the finish-processing position g to be ready for the succeeding processing.

Receiving the signal for recording sheet R1 to start from the first sheet feed means starting point, cover FC1 starts from the second conveyance means starting point e almost simultaneously. The cover FC1 arrives at the finish-processing position g at the time tg1 which precedes the time tg2 when recording sheet R1 arrives at the finish-processing position g and stays there after being subjected to the adjustment processing. Accordingly, on the first loading section 23, recording sheet R1 is stacked on the cover FC1.

In the same way as in the foregoing, recording sheet R2, partition sheet C1, recording sheet R3 and back cover UC1 are stacked on the first loading section 23 in this order, and one set of recorded object is placed on the first loading section 23. After the adjustment processing of time L7, staple processing is conducted at time L8, and a stapled recorded object is ejected to elevator type sheet ejection tray 27 from the first loading section 23.

Incidentally, in the course of conveying cover FC1, existence of a sheet on sheet loading means 21 is detected at time td1, and when the sheet exists, there is made judgment for permitting conveyance of recording sheet R following the sheet. In the example shown in FIG. 14, there is made judgment for permitting conveyance of recording sheet R3 following partition sheet C1, because the partition sheet C1 is inserted between recording sheet R2 and recording sheet R3. At time ta5, recording sheet R1 representing the first sheet in the second set of recorded object starts from the first sheet feed means starting point a, and image forming is started again.

In the finishing process stated above, an interval for conveyance of each recording sheet R is usually a basic time interval L1 for conveyance of a recording sheet. However, when inserting partition sheet Ci between recording sheet Rn and recording sheet Rn+1, there is provided time interval L3 which is the sum total of the basic time interval L1 and delay time L2 (delay DB) between recording sheet Rn and recording sheet Rn−1.

By providing a broader interval compared with an occasion to insert partition sheet Cu at conveyance timing for each recording sheet, it is possible to conduct finishing processing and thereby to convey recording sheet R in a stable manner, without increasing conveyance speed for recording sheet R in finisher 203 against conveyance speed for recording sheet R in image forming apparatus 202.

Incidentally, when inserting a sheet in recording sheets without broadening intervals of the recording sheets, it is necessary to double the conveyance speed for recording sheet R in finisher 203 to avoid interference between the recording sheet R and the sheet. When the conveyance speed for the recording sheet R is increased, conveyance is made to be unstable by a change on the half way of a conveyance course, and thereby, conveyance troubles and sheet jamming tend to be caused.

The control to broaden an interval between recording sheets is implemented by delaying the operations of the first sheet feed means 15A, 15B and 15C by time interval L2, as stated above. It is preferable, from the viewpoint of control, that the delay time L2 is established to be the same as basic time interval Li.

In the time chart stated above, the start of sheet feeding for partition sheet C1 and back cover UC1 can be implemented based on signals with which each of recording sheets R2 and R3 is detected at the first conveyance means starting point c. Each of delay DC and delay DD shows time from reception of the detection signals to the start of conveyance.

Though the first conveyance means starting point c is the time of detection of the leading edge of recording sheet by sensor S3 provided at an inlet for recording sheet on finisher 203, it is also possible to provide another sensor at an outlet for recording sheet on image forming apparatus 202 and thereby to make the detection of the leading edge of recording sheet by this sensor to be the first conveyance starting point.

Figure 15:
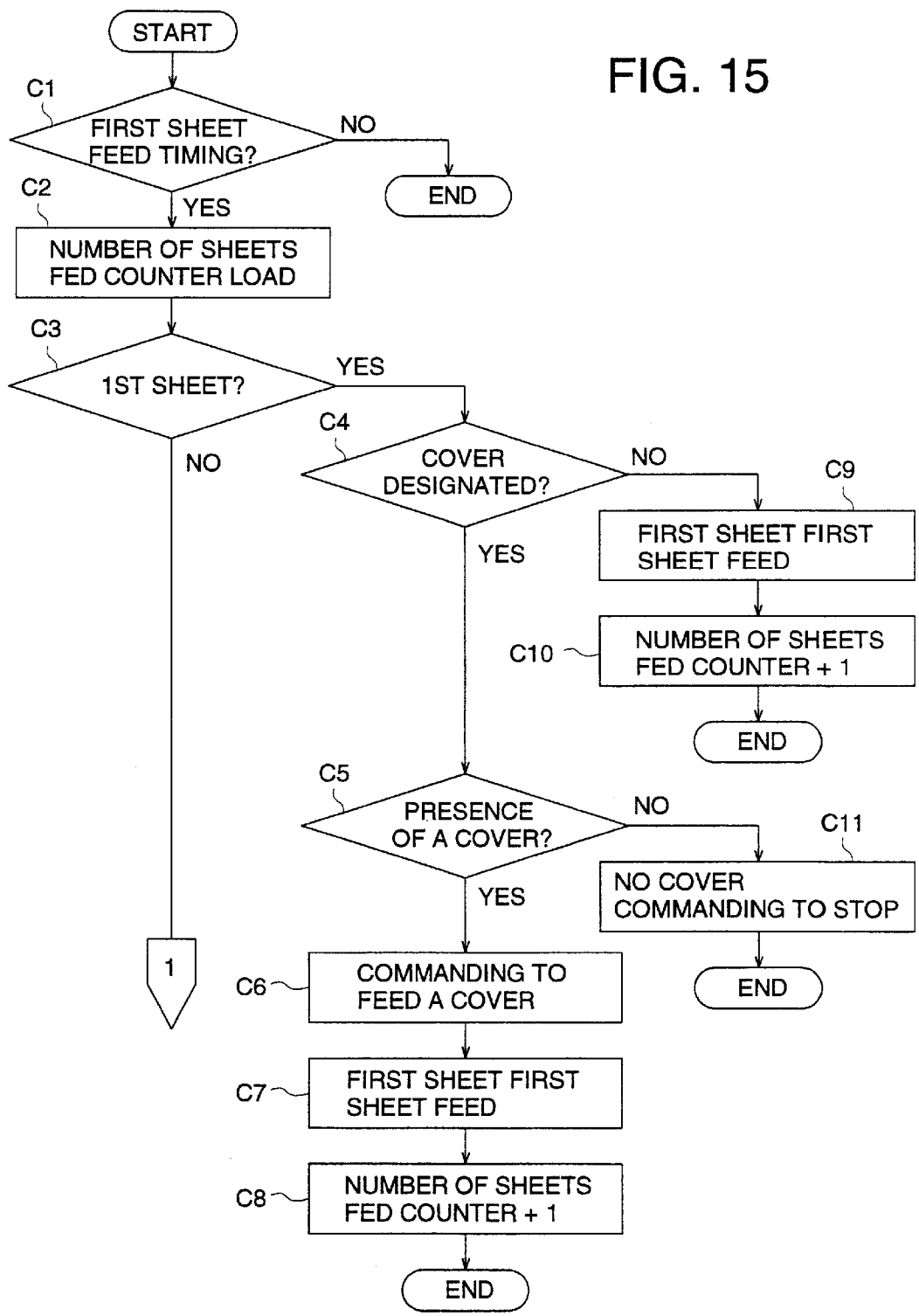
FIG. 15 is a flow chart showing an example of control of the first sheet feeding (part-1) in compound apparatus 200.
Figure 16:
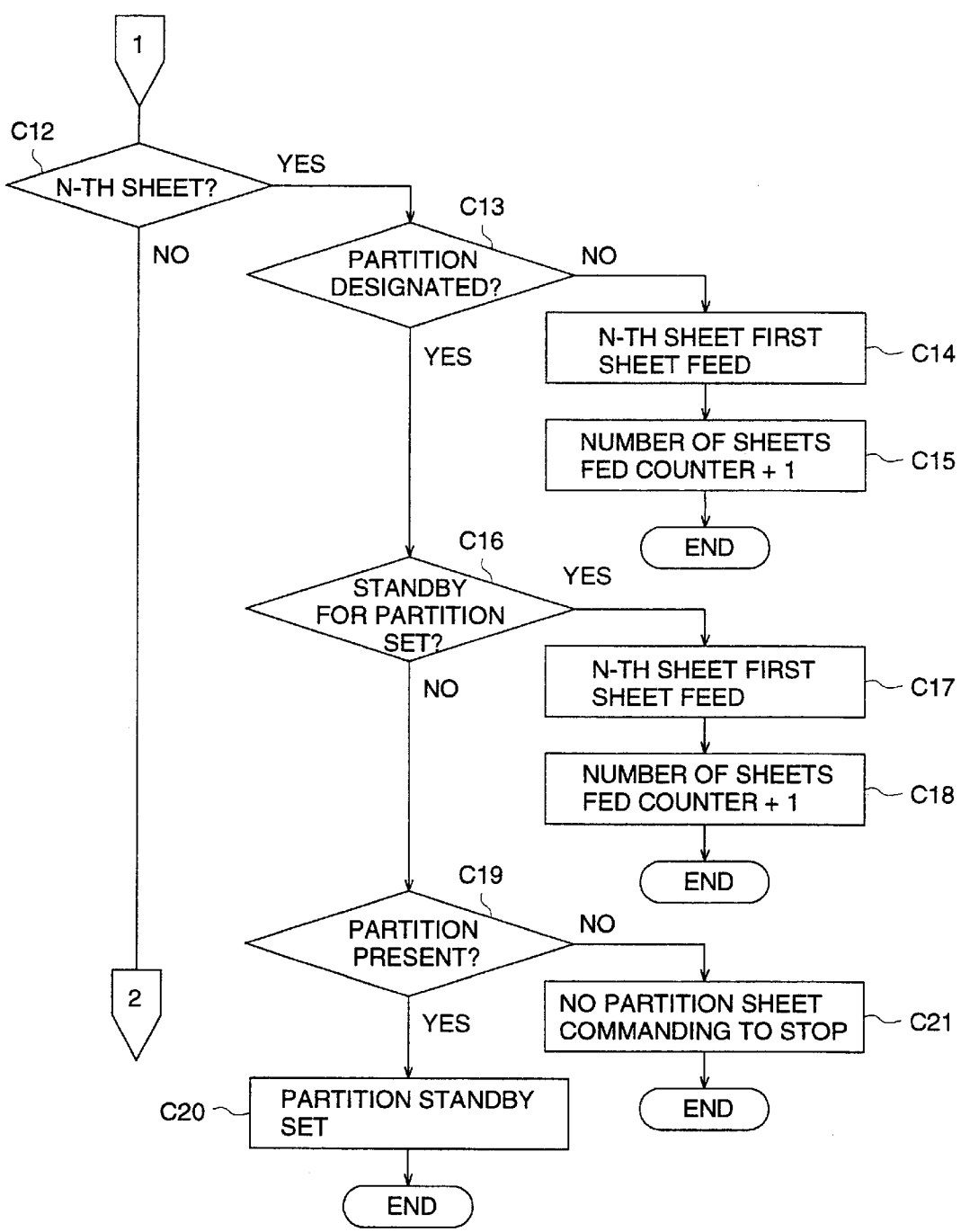
FIG. 16 is a flow chart showing an example of control of the first sheet feeding (part-2) in compound apparatus 200.
Figure 17:
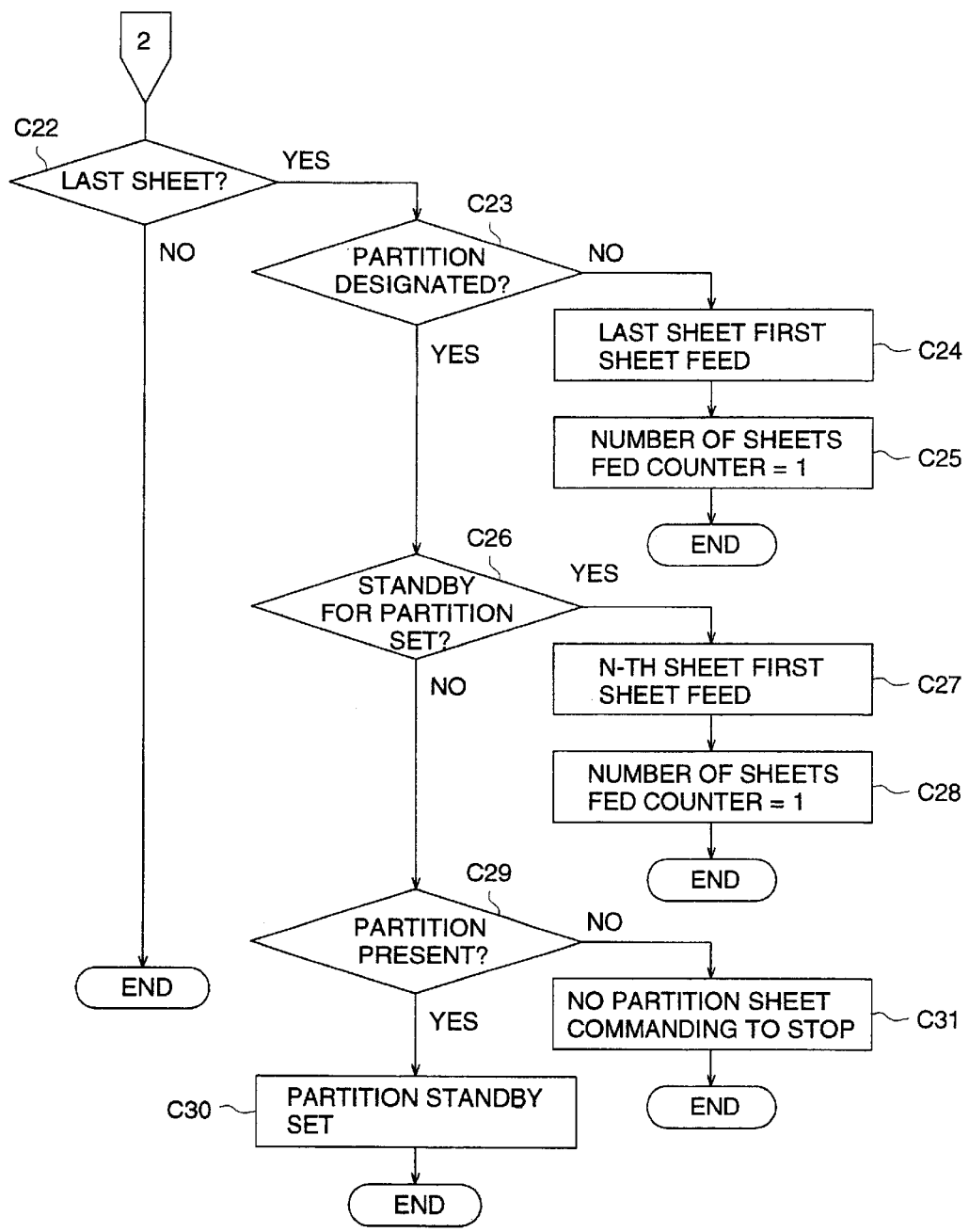
FIG. 17 is a flow chart showing an example of control of the first sheet feeding (part-3) in compound apparatus 200.

Next, the control related to first sheet feed means 15 in FIG. 14, namely, the control for conducting the first sheet feed control and another control made based on the first sheet feeding will be explained by the use of FIGS. 15–17. FIGS. 15–17 represent flow charts (part 1–part 3) showing examples of control for the first sheet feeding in compound apparatus 200. FIG. 15 shows an example of control of the first sheet feeding for the first recording sheet R, FIG. 16 shows an example of control of the first sheet feeding for the n-th recording sheet R, and FIG. 17 shows an example of control of the first sheet feeding for the last recording sheet R.

In this example, as is apparent from FIG. 14, the first sheet feed control in the sheet feeding for the first recording sheet R, the first sheet feed control in the sheet feeding for n-th recording sheet R including insertion of partition sheet K, and the first sheet feed control in the sheet feeding for the last recording sheet R are different from each other. Therefore, a flow chart will be explained after being divided into each characteristic step in conveyance process for recording sheet R and sheet K.

In step C1 in the flow chart shown in FIG. 15, there is made judgment whether it is the first sheet feed timing or not. In this case, judgment whether it is the first sheet feed timing or not is made depending on whether a button for start copying is operated or image forming is requested from a communication line. When it is not the first sheet feed timing, the control related to the first sheet feeding is ended.

When it is the first sheet feed timing, the sequence advances to step C2, and the counter value with which the number of recording sheets R for image forming has been set is loaded. After that, judgment of whether to conduct image forming on the first sheet or not is made in step C3. When conducting image forming on the first sheet, the sequence advances to step C4, and there is made judgment of whether the image forming mode for attaching a cover is set or not. When the image forming mode for attaching a cover is set, the sequence advances to step C5 wherein presence of a cover is judged. When the cover is present, the first sheet feeding shown in FIG. 14 is started, and a command for sheet feeding of the cover is outputted to the second conveyance means 114 in step C6. Then, after the first sheet feeding for the first sheet is conducted in step C7, a counter of the sheet feeding number is incremented (+1) in step C8.

Incidentally, when the mode not to attach a cover is set in step C4, the sequence advances to step C9 wherein the first sheet feeding for the first sheet is started, and a counter of the sheet feeding number is incremented (+1) in step C10 for ending.

When there are no sheets in step C5 while the mode to attach a cover is set, a stop command is outputted in step C11 for abnormal ending. This stop command is a command signal which stops execution of image forming process thereafter. In the backward flow chart, for the stop processing in the case of no sheets, as a result of checking of existence of partition sheet K, or in checking of existence of a back cover, the image forming process after the checking is stopped by control unit 19 in the same way as in the foregoing. The stop processing in this case represents a prohibition of feeding out and conveyance of recording sheet R which is scheduled to be conveyed after detection of no sheets.

In the case of no image forming for the first sheet in step C3 in the flow chart shown in FIG. 15, namely, in the case of sheet feeding for the second recording sheet R or thereafter, the sequence advances to the flow chart shown in FIG. 16. Then, in step C12, it is judged whether image forming is to be conducted for N-th sheet or not. When conducting image forming on the N-th sheet, the sequence moves to step C13 wherein it is judged whether the image forming mode to insert partition sheet K in recording sheets is designated or not. When the image forming mode to insert partition sheet K is designated, the sequence moves to step C16 wherein it is judged whether a partition-waiting flag is set or not. The partition-waiting flag in this case is an identifier which delays the first sheet feeding by delay time L2 in FIG. 14. This delay time L2 is set to be the same as recording sheet basic time interval L1.

When the partition-waiting flag is set, the sequence moves to step C17, and the first sheet feeding of the first recording sheet R is delayed by the partition-waiting time, then, the first sheet feeding shown in FIG. 14 is started, and sheet feeding for the N-th sheet is conducted. After that, a counter of the sheet feeding number is incremented (+1) in step C18.

When the partition-waiting flag is not set in step C16, the sequence moves to step C19 and it is judged whether partition sheet K exists or not. When the partition sheet K exists, the sequence moves to step C20 to set the partition-waiting flag for ending. Due to this setting of the partition-waiting flag, the timing for the following first sheet feeding is delayed and thereby, an interval between recording sheets for partition sheet K is broadened. Incidentally, when partition sheet K does not exist in step C19, a stop command resulting from no partition sheet is outputted in step C21 for abnormal ending.

In the case of no image forming for the N-th sheet in step C12 in the flow chart shown in FIG. 16, namely, in the case of sheet feeding for the last recording sheet, the sequence moves to the flow chart shown in FIG. 17. Then, in step C22, it is judged whether image forming is to be conducted for N-th sheet or not. When conducting image forming on the N-th sheet, the sequence moves to step C23 wherein it is judged whether the image forming mode to insert partition sheet K in recording sheets is designated or not. When the image forming mode to insert partition sheet K is designated, the sequence moves to step C26 wherein it is judged whether a partition-waiting flag is set or not. When this partition-waiting flag is set, the sequence moves to step C27 wherein the first sheet feeding for the (N−1)th recording sheet R is delayed by the partition-waiting time, then, the first sheet feeding shown in FIG. 14 is started, and the first sheet feeding for the (N−1)th sheet is conducted. After that, a counter of the sheet feeding number is incremented (+1) in step C28.

When the partition-waiting flag is not set in step C26, the sequence moves to step C29 and it is judged whether partition sheet K exists or not. When the partition sheet K exists, the sequence moves to step C30 to set the partition-waiting flag for ending. Due to this setting of the partition-waiting flag, the timing for the following first sheet feeding is delayed and thereby, an interval between recording sheets for partition sheet K is broadened. Incidentally, when partition sheet K does not exist in step C29, a stop command resulting from no partition sheet is outputted in step C31 for abnormal ending.

Figure 18:
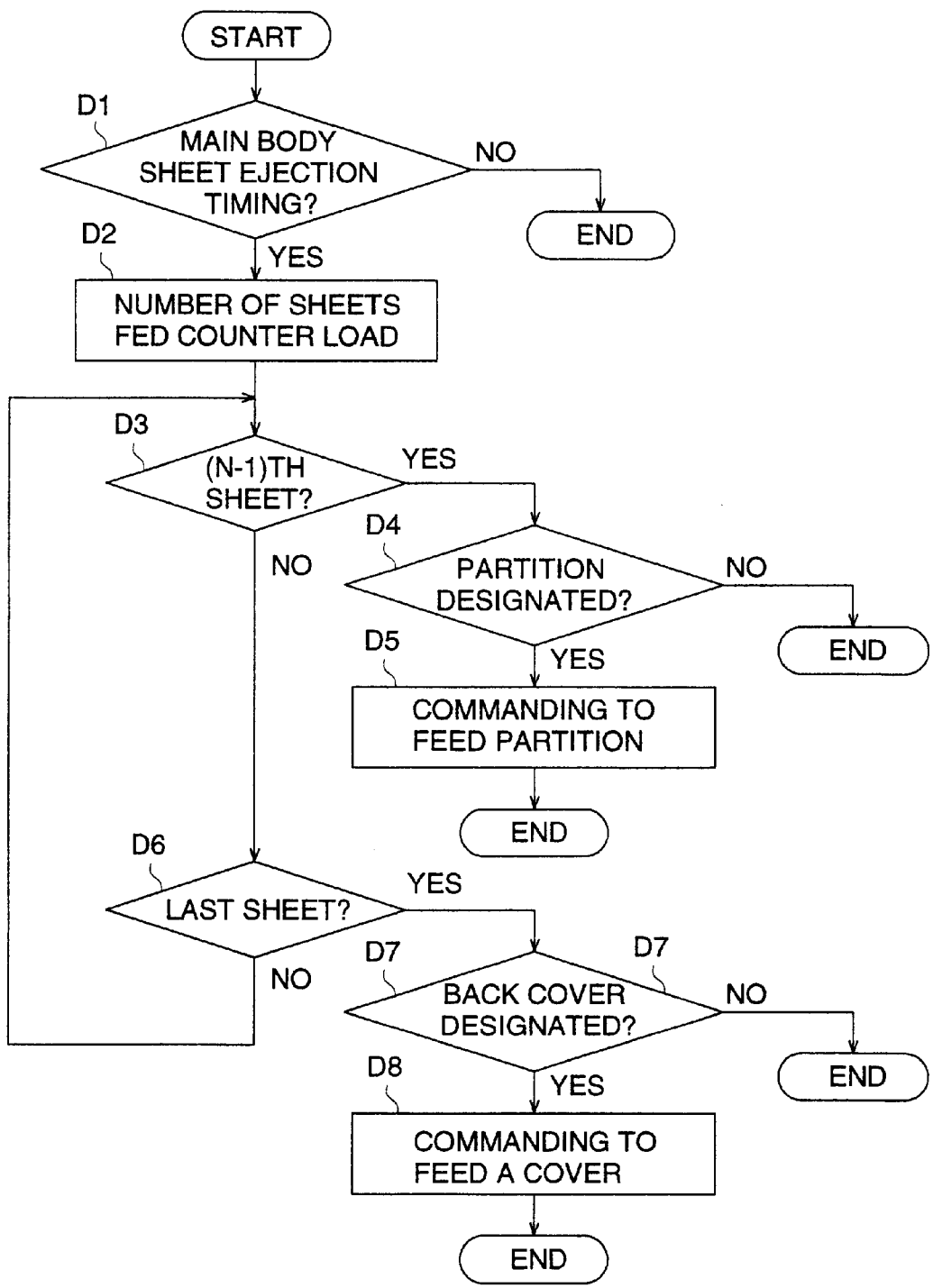
FIG. 18 is a flow chart showing an example of control for ejecting sheet out of a main body on compound apparatus 200.

Next, an example of control for ejection of recording sheet R from a main body will be explained. FIG. 18 is a flow chart showing an example of control for sheet ejection from a main body in compound apparatus 200. In this example, the control for sheet ejection from the main body is conducted based on recording sheet detection signals obtained from recording sheet sensor S3 provided at a recording sheet entrance on finisher 203. In the control for sheet ejection from the main body conducted based on recording sheet detection signals from the recording sheet sensor S3, there are originated a sheet feeding command for partition sheet C1 at time tc1 and a sheet feeding command for back cover UC1 at time tc2, as shown in FIG. 14.

In other words, the timing for ejecting recording sheet R from the main body is judged in step D1 in the flow chart shown in FIG. 18. In this case, whether it is the timing for sheet ejection from the main body or not is judged depending on whether the recording sheet R conveyed from image forming apparatus 202 to finisher 203 is detected or not. When it is not the timing for ejecting sheets from the main body, the control for sheet ejection from the main body for recording sheet R is ended.

Accordingly, in the case of the timing for ejecting sheets from the main body based on recording sheet detection signals obtained from recording sheet sensor S3 in step D1, the sequence moves to step D2 wherein a value of the counter of the sheet ejection number for recording sheet R is loaded. After that, whether the (N−1)th recording sheet R has been ejected from image forming apparatus 202 to finisher 203 or not is judged in step D3.

When the (N−1)th sheet has been ejected from image forming apparatus 202 to finisher 203, the sequence moves to step D4 wherein it is judged whether the image forming mode to insert partition sheet K in recording sheets has been designated or not. When the image forming mode to insert partition sheet K has been designated, the sequence moves to step D5 and a command for feeding a partition sheet is originated. The partition-waiting flag is set by this command for feeding a partition sheet. When the image forming mode to insert partition sheet K is not designated, the control for sheet ejection from the main body is ended.

When the (N−1)th sheet has been ejected from image forming apparatus 202 to finisher 203 in step D3, the recording sheet R is judged whether it is the last sheet or not in step D6. When the recording sheet R is not the last sheet, the sequence goes back to step D3 to detect the last sheet. When the recording sheet R is the last sheet in step D6, the sequence moves to step D7 wherein it is judged whether the image forming mode to attach a back cover is set or not. When the image forming mode to attach a back cover is set, the sequence moves to step D8 wherein a command for feeding a back cover is originated. When the image forming mode to attach a back cover is not set, the control for sheet ejection from the main body is ended. Due to this, it is possible to conduct the control for sheet ejection from the main body based on recording sheet sensor S3 arranged at a recording sheet entrance on finisher 203.

Figure 19:
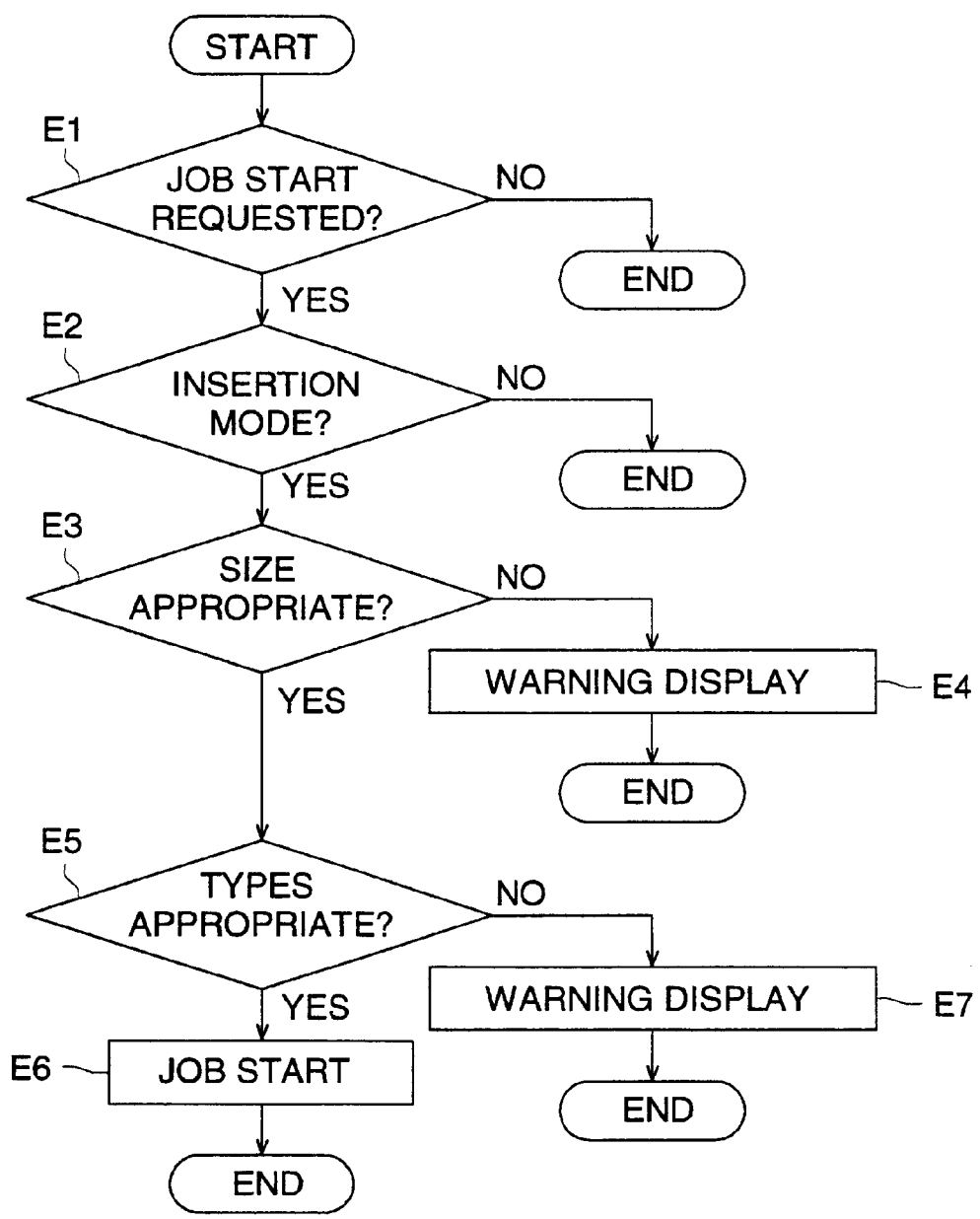
FIG. 19 is a flow chart showing an example of control for inserting sheets in various sizes in compound apparatus 200.

Next, an example of how to control insertion of sheets in recording sheets R will be explained. FIG. 19 is a flow chart showing an example of how to control insertion of sheets in various sizes in compound apparatus 200. In this example, a size of a sheet placed on sheet loading means 21 is detected, and the size of the sheet is judged whether it is in conformity with that of recording sheet R or not, and insertion of the sheet based on the judgment is controlled.

With an assumption of the foregoing, it is judged whether the start of a job was requested in step E1 of the flow chart shown in FIG. 19 or not. When the start of a job is not requested for a certain period of time, the control is ended. When the start of a job is requested in step E1, the sequence is moved to step E2 wherein the mode is judged whether it is an insertion mode or not. When the insertion mode is set in step E2, the sequence moves to step E3 wherein a size of the sheet to be inserted in recording sheets R is judged whether it is suitable or not. In this case, a size of a sheet placed on sheet loading means 21 is detected, and when the size of the sheet agrees with a size of recording sheet R, it is judged to be in conformity with the recording sheet R.

When there is no sheet having a size suitable for the recording sheet R size in step E3, the sequence moves to step E4. In the step E4, when sheets having a B4 size are set for recording sheet R having a A3 size, for example, the warning saying that "Set sheets for a cover for A3 size" is displayed by warning display means 217.

When a sheet having a size suitable for the recording sheet R size exists in step E3, the sequence moves to step E5. In the step E5, it is judged whether the type of the sheet to be inserted in recording sheet R is suitable or not. In this case, the type of the sheet placed on sheet loading means 21 is compared with the type established in advance, and when the type of the sheet agrees with the type of the sheet established in advance, the type of the sheet is judged to be suitable.

In this example, the factor of the judgment for whether the type of the sheet is suitable or not is, for example, a thickness of the sheet. On the sheet loading means 21, there is provided a detection means which detects a thickness of a sheet, and judgment to be conducted is comparison between the results of the detection made by the detection means and a sheet thicness established by an operator. Therefore, when the type of the sheet to be inserted in recording sheet R is suitable, the sequence moves to step E6 where the job related to the control of sheet insertion is started.

Incidentally, when the type of the sheet is not suitable in step E5, the sequence moves to step E7. In the step E7, the warning for resetting sheets such as, for example, the warning saying that "Set the thick sheet for a cover" is displayed. After that, the control of the sheet insertion is ended. In this way, the warning is displayed when sheet size and type are not suitable. It is therefore possible to conduct the control of sheet insertion based on judgment whether the sheet size is suitable for recording sheet R or not.

Figure 20:
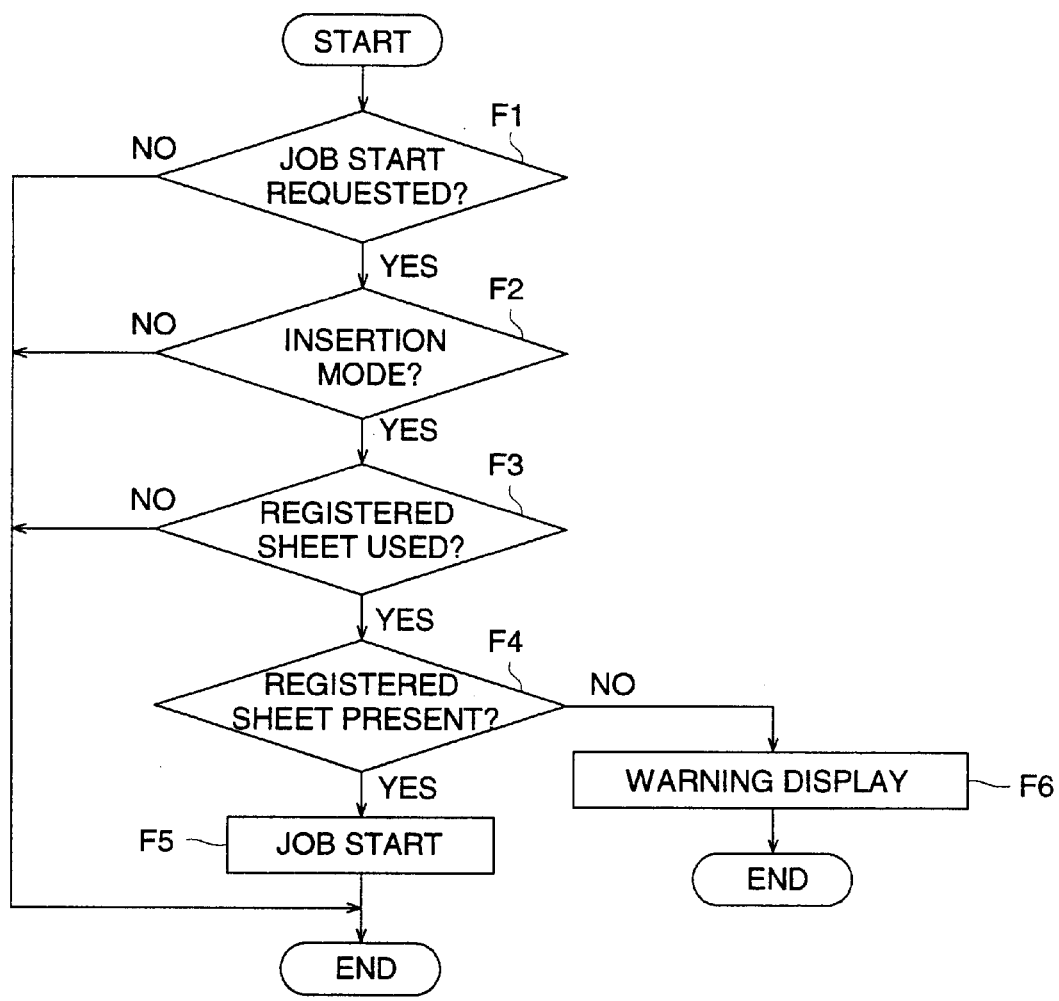
FIG. 20 is a flow chart showing an example of control in registration mode for various types of sheets in compound apparatus 200.

Next, there will be explained an example of the control wherein sheet types are established in a registration mode. FIG. 20 is a flow chart showing an example of the control in a registration mode for sheet types in compound apparatus 200. In this example, there is assumed an occasion wherein plural sheet loading means 21 are provided, and sheets of different types are stacked to be used. In the compound apparatus 200 of this kind, a type of sheets stacked on the specific sheet loading means 21 is registered in a memory of finisher 203 as a registration mode, and by selecting the registered mode, a sheet of the specific type is received from the specific sheet loading means 21, and then, processing is conducted.

Under this assumption, there is made judgment whether or not a job was required to start in step F1 in the flow chart shown in FIG. 20. When the job is not required to start for a certain period of time, the control is ended. When the job is required to start in step F1, the sequence moves to step F2 wherein a mode is judged whether it is an insertion mode or not. When the insertion mode is set in step F2, the sequence moves to step F3 wherein judgment is made whether the sheet registered in advance is to be used or not regarding the sheet to be inserted in recording sheets R. In this case, the sheets stacked on sheet loading means 21 are detected whether they represent those registered in advance or not, and when the sheets agree with registered sheets, judgment is made to use the sheets. When it is judged, in step F3, not to use the sheets registered in advance, the control based on the registration mode for sheet types is ended.

When it is judged, in step F3, to use the sheets registered in advance, the sequence moves to step F4 wherein it is judged whether the registered sheets exist or not. When the registered sheets exist, the sequence moves to step F5 and a job relating to the control of sheet insertion is started. When the sheets registered in advance are judged not to exist in step F4, the sequence moves to step F6. In step F6, when B5 size sheets registered in advance are not set for recording sheets in B5 size, for example, the warning saying that "Set B5 size sheets for a cover" is displayed by warning display means 217. After that, the control based on the registration mode for sheet types is ended. Due to this, a sheet of the specific type is received from the specific sheet loading means 21, and then, processing can be conducted.

Figure 21:
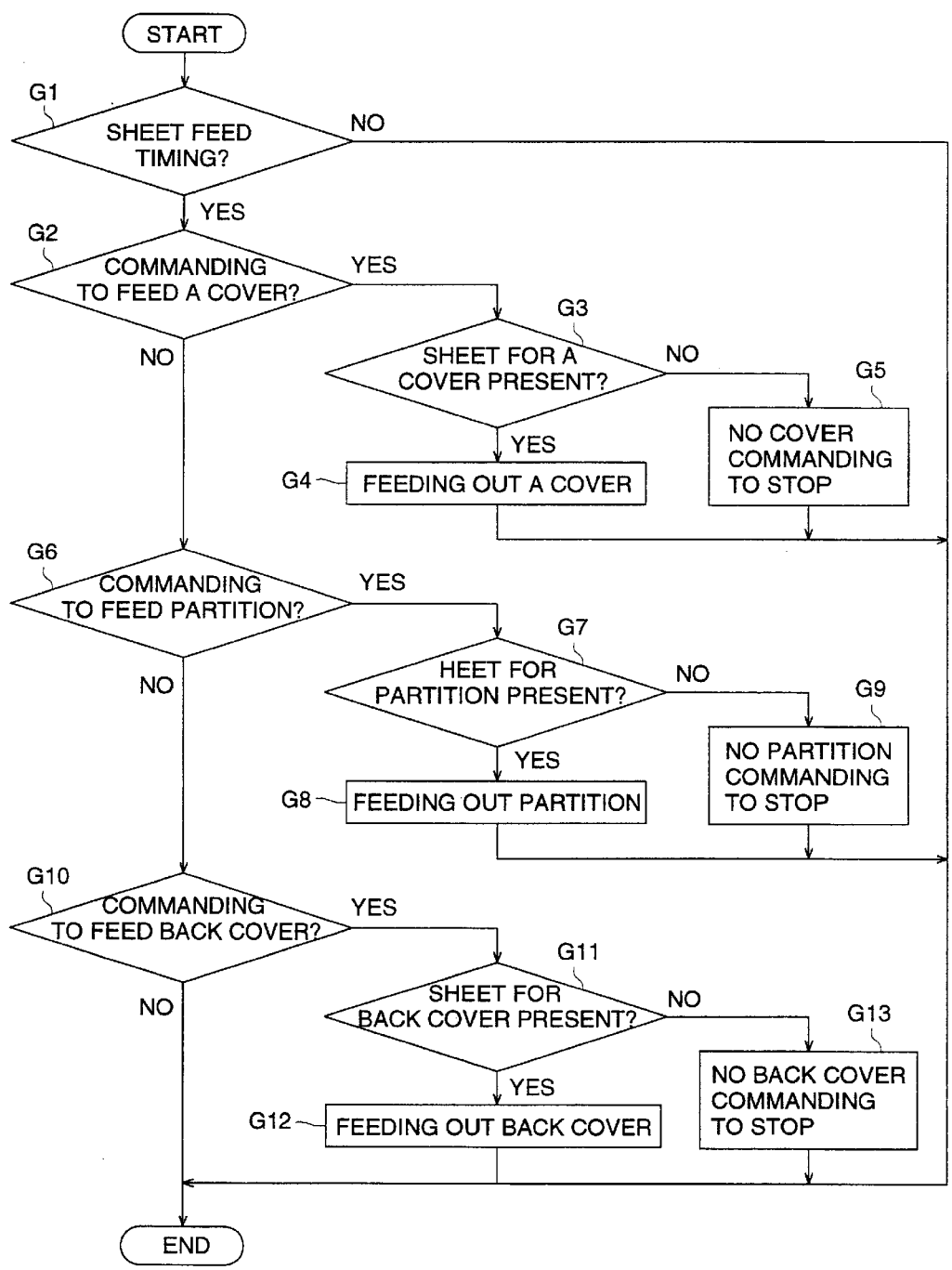
FIG. 21 is a flow chart showing an example of controlling feed out of a cover and a back cover, or a partition sheet in copying machine 200.

Next, there will be explained an example of the control for feeding out of a cover and a back cover or partition sheet K. FIG. 21 is a flow chart showing an example of the control for feeding out of a cover and a back cover in copying machine 200. In this example, it is assumed that a mode to attach a cover and a back cover or partition sheet K is set, and there is issued a command to feed a cover, a partition sheet or a back cover, to recording sheets R outputted by the first sheet feeding.

Under this assumption, timing is judged, in step G1 in the flow chart shown in FIG. 21, whether it is sheet feeding timing or not. In this case, the timing is judged whether it is sheet feeding timing or not, dependint on whether there is an operation of a button to start copying or a request for image forming coming from a communication line. When the timing is not sheet feeding timing, the control for feed out relating to a cover is ended. Therefore, when the timing is judged, in step G1, to be sheet feeding timing, the sequence moves to step G2 where it is detected whether there is a command for sheet feeding of a cover or not. In this case, the command for feeding a cover is issued at time ta1 in first sheet feeding means starting point a shown in FIG. 14.

Accordingly, when there is a command for sheet feeding of a cover, the sequence moves to step G3 where it is judged whether there are sheets for a cover or not. When sheets for a cover exist, the sequence moves to step G4 and a cover is fed out of sheet loading means 21. When sheets for a cover do not exist, the sequence moves to step G5 and a suspension command for no sheets for a cover is issued, and then, the control for feeding out relating to a cover is ended.

When there is no sheet feeding command for a cover in step G2, the sequence moves to step G4 wherein it is judged whether there is a command for feeding partition sheets or not. In this case, a command for feeding partition sheets is issued at time tc1 in first conveyance means starting point j shown in FIG. 14. Therefore, when there is a command for feeding a partition sheet, the sequence moves to step G7 wherein it is judged whether partition sheets K exist or not. When the partition sheets K exist, the sequence moves to step G8 and partition sheet K is fed out of sheet loading means 21. When there are no partition sheets K, the sequence moves to step G9. When sheets for a cover do not exist, the sequence moves to step G5 and a suspension command for no partition sheets is issued, and then, the control for feeding out relating to partition sheet K is ended.

Further, when there is no command for feeding a partition sheet in step G6, the sequence moves to step G10 where it is detected whether there is a command for feeding a back cover or not. In this case, a command for feeding a back cover is issued at time td3 in first conveyance means starting point j shown in FIG. 14. Therefore, when there is a command for feeding a back cover, the sequence moves to step G11 and it is judged whether there are back cover sheets or not. When there are back cover sheets, the sequence is moved to step G12 and a back cover is fed out of sheet loading means 21. When there are no back cover sheets, the sequence moves to step G13. When sheets for a cover do not exist, the sequence moves to step G5 and then, the control for feeding out relating to a back cover is ended.

Due to this, it is possible to attach a cover, a back cover or partition sheet K on recording sheets R based on a command for feeding a cover, a command for feeding a partition sheet or a command for feeding a back cover. Accordingly, it is possible to conduct processing to form monochrome images and color images in parallel on respective recording sheets R by two recording apparatuses #1 and #2 based on given image information from an image information source, and then, to collect the recording sheets to one location by conveyance means 8 in finisher 203. Thus, a booklet can be prepared by binding, with good reproducibility, the recording sheets R wherein monochrome documents and color documents both after image forming are mixed.

(3) Second Example

Figure 22:
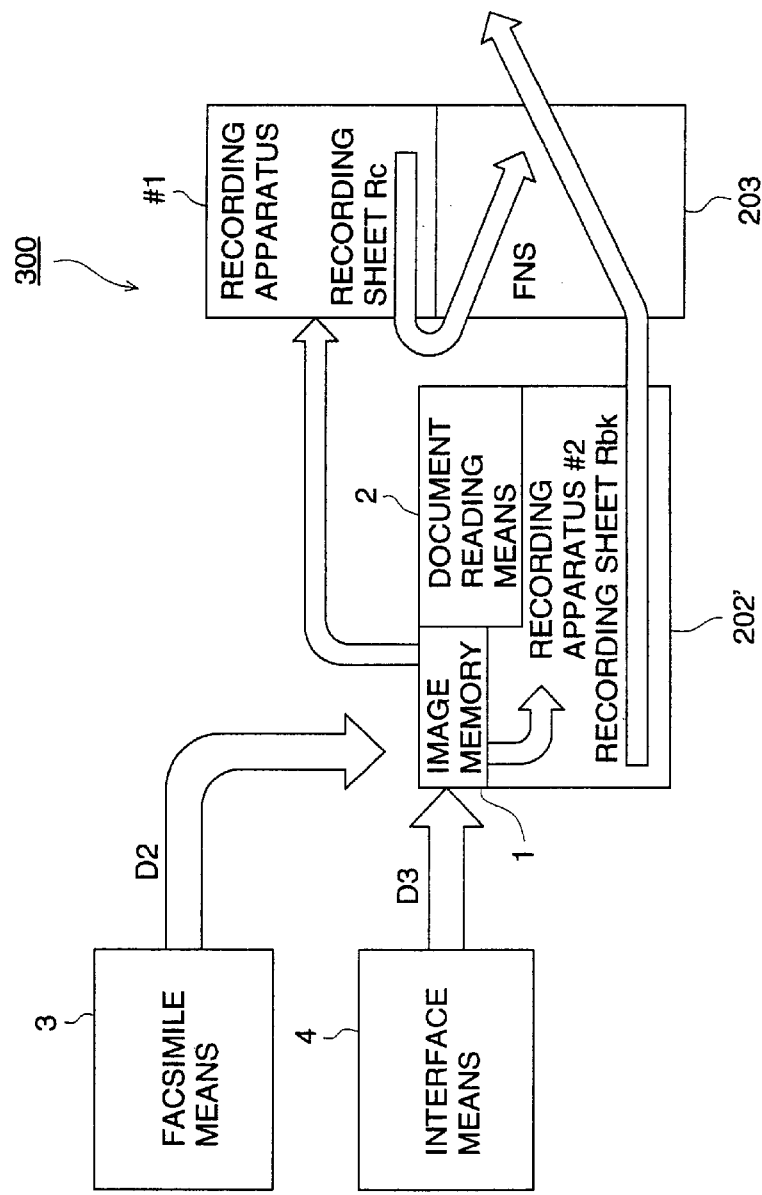
FIG. 22 is a conceptual diagram showing an example of structure of compound apparatus 300 representing the second example.

FIG. 22 is a conceptual diagram showing an example of structure of compound apparatus 300 representing Second Example. The compound apparatus 300 shown in FIG. 22 is one wherein recording apparatus #1 for forming color images is arranged on the part of finisher 203. In other words, it is one wherein recording apparatus #1 of an ink jet system in First Example is separated and mounted on finisher 203. With this structure, it is not necessary to handle from design change of internal structure of an existing compound apparatus of an electro-photographic system, and thereby it is possible to constitute compound apparatus 300 wherein recording sheets R containing mixedly monochrome documents and color documents can be bound, with good reproducibility, to be a booklet.

Compound apparatus 300 shown in FIG. 22 is provided with image memory 1, document reading means 2 and image forming apparatus 202' having therein recording apparatus #2, and the image memory 1 is connected with the document reading means 2, facsimile means 3 and interface means 4, thereby, received image data D2 received through FAX receiving, processing image data D3 from external computers and document image data D1 obtained through reading of the document are stored temporarily. As recording apparatus #2, a monochrome image forming apparatus of an electro-photographic system is used.

Finisher 203 is provided to be adjacent to the image forming apparatus 202', and recording apparatus #1 of an ink jet system for color images is mounted on the finisher 203. For the purpose of synchronization between recording apparatus #1 and recording apparatus #2, it is preferable that communication processing is conducted between control unit 19 shown in First Example and a control unit provided on recording apparatus #1. It is also preferable that a conveyance means is structured so that a sheet ejection outlet on recording apparatus #1 may join with that on recording apparatus #2.

In this example, color images are formed on a recording sheet by recording apparatus #1, while monochrome images are formed on a recording sheet by recording apparatus #2, and then, color image recording sheet Rc by recording apparatus #1 and monochrome recording sheet Rbk by recording apparatus #2 are put together by finisher 203.

Due to this, it is possible to form a copied object wherein color image recording sheets Rc and monochrome image recording sheets Rbk both image-formed based on an image information source in which monochrome documents and color documents are mixed are bound, with good reproducibility, to be a booklet, without making a big design change on internal structures of an existing compound apparatus of an electro-photographic system.

As stated above, in the compound recording apparatus relating to the invention, there is provided a finishing means wherein two or more recording sheets which have been subjected to image forming processing in parallel are collected to one location to be subjected to finish-processing.

Due to this structure, it is possible to collate two or more recording sheets after image forming at high speed in the order designated in advance, or to staple one end of the collated recording sheets, or to attach a cover and a back cover on the stapled recording sheets, or to fold two or more recording sheets after image forming in a folio form and collate them, or to attach a cover and a back cover on the recording sheets in a folio form whose one end is stapled.

Due to this structure, with regard to recording sheets collected to one location, for example, plural recording sheets after image forming are collated at high speed in the order designated in advance, or these recording sheets are stapled after they are collated, or a cover and a back cover are attached on the collated recording sheets and the recording sheets are stapled, or the recording sheets after image forming are folded in a folio form and collated, or a cover and a back cover are attached on the collated recording sheets in a folio form which is then stapled. Therefore, when binding a booklet from a compound document in which monochrome documents and color documents are mixed, for example, it is possible to bind recording sheets on which monochrome images are formed and recording sheets on which color images are formed at high speed in the order designated in advance.

What is claimed is:

1. An apparatus for producing a printed product, comprising:
   a plurality of image forming devices to form images on a plurality of recording sheets based on a plurality of image data arbitrarily obtained, wherein each of said image forming devices forms a separate image on a separate recording sheet in parallel with the other image forming devices;
   a sheet finisher to accept said plurality of recording sheets ejected from said plurality of image forming devices and apply a designated finish-processing to said plurality of recording sheets on which said images are already formed by said plurality of image forming devices;
   a discriminator to discriminate between monochrome image data and color image data among said plurality of image data, when each of said plurality of image data corresponds to each of a plurality of sheet pages; and
   a controller for recognizing an inserting page number of a color-image sheet within monochrome-image sheets and performing an arithmetic processing to determine a starting time of forming images on said color-image sheet in relation to starting times of forming images on said monochrome-image sheets.

2. The apparatus of claim 1,
   wherein said controller commands said sheet finisher to arrange said plurality of recording sheets, on which said images are already formed by said plurality of image forming devices, in a designated order.

3. The apparatus of claims 1,
   wherein said controller designates contents of said finish-processing to be applied to said plurality of recording sheets, on which said images are already formed by said plurality of image forming devices.

4. The apparatus of claim 1,
   wherein said sheet finisher binds an end of a bunch of said recording sheets after aligning said plurality of recording sheets.

5. The apparatus of claim 1,
   wherein said sheet finisher attaches a front cover to a bunch of said recording sheets after aligning said plurality of recording sheets.

6. The apparatus of claim 1,
   wherein said sheet finisher attaches a front cover and a back cover to a bunch of said recording sheets after aligning said plurality of recording sheets.

7. The apparatus of claim 1,
   wherein said sheet finisher collates said plurality of recording sheets by folding them into a folio form.

8. The apparatus of claim 1,
   wherein said sheet finisher attaches a front cover to a bunch of said recording sheets after collating said plurality of recording sheets by folding them into a folio form.

9. The apparatus of claim 1,
   wherein said sheet finisher attaches a front cover and a back cover to a bunch of said recording sheets after collating said plurality of recording sheets by folding them into a folio form.

10. The apparatus of claim 1, further comprising:

a document reader for reading images of arbitrary documents to generate said plurality of image data.

11. The apparatus of claim 1, further comprising:

a facsimile device for receiving document image data sent from another apparatus to obtain said plurality of image data.

12. The apparatus of claim 1, further comprising:

an interface for receiving document image data sent from an external computer to obtain said plurality of image data.

13. The apparatus of claim 1, wherein at least one of said image forming devices forms monochrome images on said recording sheets, based on the monochrome image data, while at least one of said image forming devices forms color images on said recording sheets based on the color image data.

14. The apparatus of claim 13, wherein said controller controls said plurality of image forming devices so as to perform arrangements between a monochrome image formation process and a color image formation process.

15. The apparatus of claim 1, wherein at least one of said image forming devices forms said images by means of an electro-photographic process, while at least one of said image forming devices forms said images by means of an ink-jetting process.

16. The apparatus of claim 1, further comprising;

a memory to store both said monochrome image data and said color image data;

wherein said controller controls said memory so as to edit said monochrome image data and said color image data, based on a designated order of said plurality of sheet pages.

17. The apparatus of claim 16, wherein said controller controls a readout action of said memory, so as to transmit said monochrome image data or said color image data to each of said plurality of image forming devices at a predetermined timing.

18. The apparatus of claim 1, further comprising:

a plurality of sheet supplying sections to supply said recording sheets to said plurality of image forming devices, wherein each of said plurality of sheet supplying sections separately supplies said recording sheets to each of said plurality of image forming devices.

19. The apparatus of claim 1, further comprising:

a sheet supplying section to distribute said recording sheets among said plurality of image forming devices through conveyance paths of said recording sheets.

20. The apparatus of claim 19, further comprising:

a conveyance path changeover element to change said conveyance paths, each of which is coupled to each of said plurality of image forming devices.

21. The apparatus of claim 1, further comprising:

a conveyor for conveying said recording sheets ejected from each of said plurality of image forming devices, so as to collect said recording sheets in said sheet finisher; and a delivery tray to receive said printed product delivered from said sheet finisher after finishing said designated finish-processing.

22. The apparatus of claim 1, wherein said sheet finisher comprises a standby section, in which said recording sheets with monochrome-images are temporally stored at a standby position.

* * * * *